United States Patent
Todoroki et al.

(10) Patent No.: US 12,551,578 B2
(45) Date of Patent: Feb. 17, 2026

(54) COMPOUND OR SALT THEREOF

(71) Applicants: SHIZUOKA PREFECTURAL UNIVERSITY CORPORATION, Shizuoka (JP); MEDICAL CORPORATION KINSHUKAI, Osaka (JP); HAMAMATSU PHOTONICS K.K., Hamamatsu (JP)

(72) Inventors: Kenichiro Todoroki, Shizuoka (JP); Yoshitaka Hamashima, Shizuoka (JP); Hiromichi Egami, Shizuoka (JP); Satoshi Nakagawa, Shizuoka (JP); Toshihiro Sakai, Sakai (JP); Osamu Inoue, Sakai (JP); Shingo Nishiyama, Hamamatsu (JP); Masakatsu Kanazawa, Hamamatsu (JP); Hideo Tsukada, Hamamatsu (JP)

(73) Assignees: SHIZUOKA PREFECTURAL UNIVERSITY CORPORATION, Shizuoka (JP); MEDICAL CORPORATION KINSHUKAI, Osaka (JP); HAMAMATSU PHOTONICS K.K., Hamamatsu (JP)

( * ) Notice: Subject to any disclaimer, the term of this patent is extended or adjusted under 35 U.S.C. 154(b) by 856 days.

(21) Appl. No.: 17/772,259

(22) PCT Filed: Nov. 4, 2020

(86) PCT No.: PCT/JP2020/041254
§ 371 (c)(1),
(2) Date: Apr. 27, 2022

(87) PCT Pub. No.: WO2021/090850
PCT Pub. Date: May 14, 2021

(65) Prior Publication Data
US 2022/0401590 A1    Dec. 22, 2022

(30) Foreign Application Priority Data
Nov. 8, 2019    (JP) .................. 2019-203236

(51) Int. Cl.
A61K 51/04    (2006.01)
C07B 59/00    (2006.01)

(52) U.S. Cl.
CPC .......... *A61K 51/0455* (2013.01); *C07B 59/00* (2013.01)

(58) Field of Classification Search
None
See application file for complete search history.

(56) References Cited

U.S. PATENT DOCUMENTS

2016/0031941 A1* 2/2016 Eckert .................. C07K 14/315
435/7.1

FOREIGN PATENT DOCUMENTS

| CN | 109721599 A | 5/2019 |
| WO | WO 2004/054978 A1 | 7/2004 |
| WO | WO-2010/080819 A1 | 7/2010 |
| WO | WO-2011/084585 A2 | 7/2011 |

(Continued)

OTHER PUBLICATIONS

Durka (Cationic and Betaine-Type Boronated Acridinium Dyes: Synthesis, Characterization, and Photocatalytic Activity. ACS Omega. Feb. 1, 2019). (Year: 2019).*
Sun (Boronic acids for fluorescence imaging of carbohydrates. ChemComm. 2016). (Year: 2016).*
Egami, Hiromichi et al., "$^{18}$F-Labeled dihydromethidine: positron emission tomography radiotracer for imaging of reactive oxygen species in intact brain," Organic & Biomolecular Chemistry, Feb. 17, 2020, vol. 18 (13), pp. 2387-2391.
Hou, C. et al., "Development of a Positron Emission Tomography Radiotracer for Imaging Elevated Levels of Superoxide in Neuroinflammation," ACS Chemical Neuroscience, 2018, vol. 9(3), pp. 578-586.
Kundu, K. et al., "A Significant Improvement of the Efficacy of Radical Oxidant Probes by the Kinetic Isotope Effect," Angewandte Chemie, International Edition, 2010, vol. 49 (35), pp. 6134-6138.

(Continued)

*Primary Examiner* — Michael G. Hartley
*Assistant Examiner* — Samantha L Mejias
(74) *Attorney, Agent, or Firm* — Faegre Drinker Biddle & Reath LLP

(57) ABSTRACT

The present invention relates to a compound represented by the following General Formula (1) or a salt thereof.

[Chem. 1]

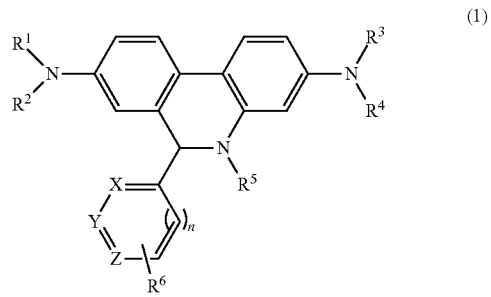

In General Formula (1), $R^1$, $R^2$, $R^3$ and $R^4$ each independently represent a hydrogen atom, a linear or branched alkyl group which may have a substituent or the like. $R^1$ and $R^2$ may be bonded to each other to form a ring. $R^3$ and $R^4$ may be bonded to each other to form a ring. $R^1$ and/or $R^2$ may be bonded to a 6-membered ring to which —$NR^1R^2$ is bonded to form a ring. $R^3$ and/or $R^4$ may be bonded to a 6-membered ring to which —$NR^3R^4$ is bonded to form a ring. $R^5$ represents —$^{11}CH_3$, a linear or branched alkyl group which may have a substituent or the like. $R^6$ represents —F, —$^{18}$F or the like. X, Y and Z each independently represent a carbon atom, an oxygen atom or the like. n is 0 or 1.

5 Claims, 5 Drawing Sheets

(56) References Cited

FOREIGN PATENT DOCUMENTS

WO     WO-2011084582 A1 *   7/2011   ............... C10G 1/06
WO     WO 2016/136718 A1    9/2016

OTHER PUBLICATIONS

Maghzal, G. J. et al., "Assessment of Myeloperoxidase Activity by the Conversion of Hydroethidine to 2-Chloroethidium," Journal of Biological Chemistry, 2014, vol. 289 (9), pp. 5580-5595.
International Preliminary Report on Patentability mailed May 19, 2022 for PCT/JP2020/041254.
Columbus, Ohio, STN Registry[online], Jan. 2, 2005, p. 1-p. 7.

* cited by examiner

COMPOUND OR SALT THEREOF

TECHNICAL FIELD

The present invention relates to a compound or a salt thereof suitable for imaging applications of reactive oxygen species.

BACKGROUND ART

Oxygen taken into a living body is consumed by the metabolic system for energy production. On the other hand, a small percentage of oxygen taken into a living body is changed to reactive oxygen species (ROS) such as superoxide anions, hydroxyl radicals, or hydrogen peroxide. As a major source of ROS, the mitochondrial electron transport chain may be exemplified. The ROS produced in a living body are generally converted to water in the presence of enzymes such as superoxide dismutase and catalase, and detoxified. On the other hand, if the amount of ROS produced increases, protein denaturation, lipid oxidation, and DNA damage can be induced.

As a probe for detecting ROS in a living body, for example, Patent Literature 1 discloses a compound suitable for imaging an ROS distribution in mammal tissues through positron emission tomography (PET).

CITATION LIST

Patent Literature

[Patent Literature 1] PCT International Publication No. WO2011/084585

SUMMARY OF INVENTION

Technical Problem

Nerve cell damage due to many neurodegenerative diseases such as Parkinson's disease and Alzheimer's disease are thought to be caused by ROS produced according to mitochondria function disorders. The production of ROS is thought to be caused earlier than the onset of these diseases. PET probes that can measure accumulation of abnormal proteins such as amyloid β protein and phosphorylated tau protein are used for diagnosing Alzheimer's disease. However, the accumulation of these abnormal proteins in the brain does not necessarily reflect symptoms, and even if these abnormal proteins are removed with antibodies, the symptoms may not improve. Therefore, when treatment is considered, it has become clear that diagnosis is too late with a method of measuring accumulated abnormal proteins. Therefore, if a reactive oxygen species imaging agent (for example, a PET probe) that can measure the amount of ROS produced in the early stage of nerve cell damage can be developed, it can be expected that it would contribute to earlier and more accurate diagnosis and treatment.

An object of the present invention is to provide a compound or a salt thereof that can detect reactive oxygen species (ROS) in a living body with high sensitivity.

Solution to Problem

A first aspect of the present invention relates to a compound represented by the following General Formula (1) or a salt thereof.

[Chem. 1]

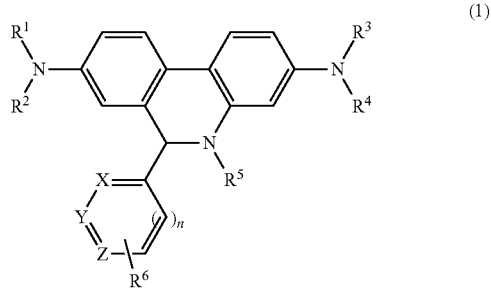

[in General Formula (1), $R^1$, $R^2$, $R^3$ and $R^4$ each independently represent a hydrogen atom, a linear or branched alkyl group which may have a substituent, a linear or branched alkenyl group which may have a substituent, a linear or branched alkynyl group which may have a substituent, a cycloalkyl group which may have a substituent, an aromatic hydrocarbon group which may have a substituent, or a heterocyclic group which may have a substituent; $R^1$ and $R^2$ may be bonded to each other to form a ring; $R^3$ and $R^4$ may be bonded to each other to form a ring; $R^1$ and/or R may be bonded to a 6-membered ring to which —$NR^1R^2$ is bonded to form a ring; $R^3$ and/or $R^4$ may be bonded to a 6-membered ring to which —$NR^3R^4$ is bonded to form a ring; $R^5$ represents —$^{11}CH_3$, a linear or branched alkyl group which may have a substituent, a linear or branched alkenyl group which may have a substituent, a linear or branched alkynyl group which may have a substituent, a cycloalkyl group which may have a substituent, an aromatic hydrocarbon group which may have a substituent, or a heterocyclic group which may have a substituent; $R^6$ represents —F, —$CH_3$, —$^{18}F$ or —$^{11}CH_3$; X, Y and Z each independently represent a carbon atom, an oxygen atom, a sulfur atom or a nitrogen atom; and n is 0 or 1].

The compound or a salt thereof according to the first aspect can detect reactive oxygen species (ROS) in a living body with high sensitivity.

A second aspect of the present invention relates to a compound or a salt thereof in which, in General Formula (1), $R^1$, $R^2$, $R^3$ and $R^4$ are not all hydrogen atoms. In the compound or a salt thereof according to the second aspect, it is more preferable that $R^1$ and $R^3$ not be a hydrogen atom.

A compound administered into a living body may intercalate into DNA. When a compound intercalates into DNA, it may exhibit mutagenicity (a property of causing irreversible changes in genetic information). The compound or a salt thereof according to the second aspect of the present invention can solve the problem of allowing detecting ROS in the living body with high sensitivity and intercalation into DNA. That is, the compound or a salt thereof according to the second aspect of the present invention is less likely to cause intercalation into DNA, and allows detection of ROS in the living body with high sensitivity, and is safer for a living body.

The present invention also relates to a reactive oxygen species imaging agent containing the above compound or a salt thereof according to the present invention as an active ingredient.

The present invention also relates to a compound represented by the following General Formula (2) or a salt thereof.

[Chem. 2]

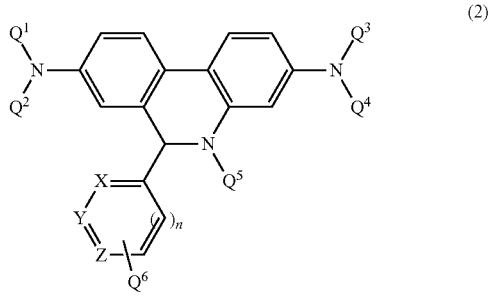

(2)

[in General Formula (2), $Q^1$, $Q^2$, $Q^3$ and $Q^4$ each independently represent a hydrogen atom, a tert-butyloxycarbonyl group, a benzyloxycarbonyl group, a linear or branched alkyl group which may have a substituent, a linear or branched alkenyl group which may have a substituent, a linear or branched alkynyl group which may have a substituent, a cycloalkyl group which may have a substituent, an aromatic hydrocarbon group which may have a substituent, or a heterocyclic group which may have a substituent; $Q^1$ and $Q^2$ may be bonded to each other to form a ring; $Q^3$ and $Q^4$ may be bonded to each other to form a ring; $Q^1$ and/or $Q^2$ may be bonded to a 6-membered ring to which —$NQ^1Q^2$ is bonded to form a ring; $Q^3$ and/or $Q^4$ may be bonded to a 6-membered ring to which —$NQ^3Q^4$ is bonded to form a ring; $Q^5$ represents —$^{11}CH_3$, a tert-butyloxycarbonyl group, a benzyloxycarbonyl group, a linear or branched alkyl group which may have a substituent, a linear or branched alkenyl group which may have a substituent, a linear or branched alkynyl group which may have a substituent, a cycloalkyl group which may have a substituent, an aromatic hydrocarbon group which may have a substituent, or a heterocyclic group which may have a substituent; $Q^6$ represents a boronic acid group, a boronic acid ester group, a trifluoroborate base or a triolborate base; X, Y and Z each independently represent a carbon atom, an oxygen atom, a sulfur atom or a nitrogen atom; and n is 0 or 1].

The compound represented by General Formula (2) or a salt thereof is useful as a precursor compound when the compound represented by General Formula (1) or a salt thereof is produced.

Advantageous Effects of Invention

According to the present invention, it is possible to provide a compound or a salt thereof that can detect reactive oxygen species (ROS) in a living body with high sensitivity.

DESCRIPTION OF EMBODIMENTS

Figure 1:
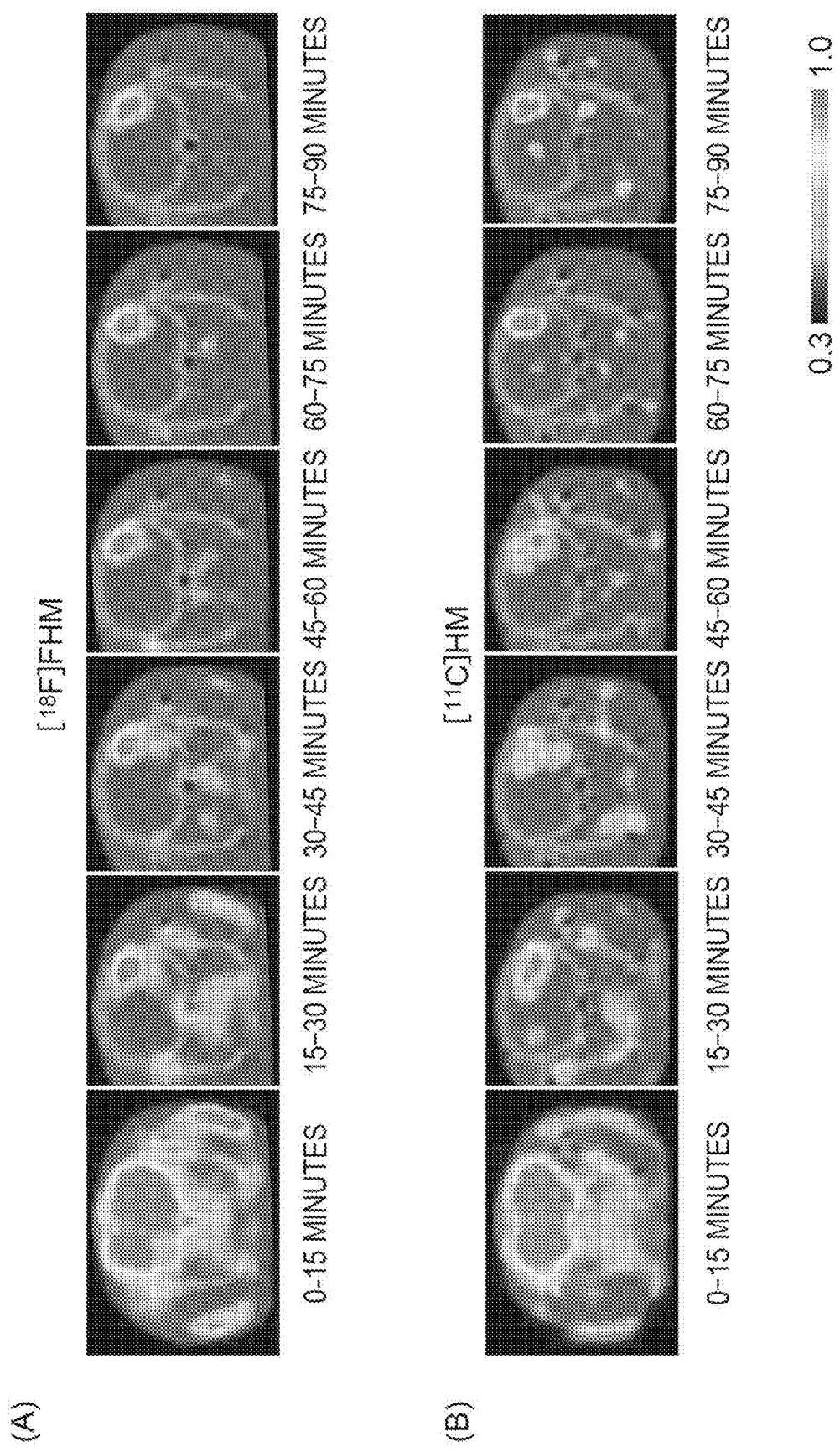
FIG. 1 shows images in which PET accumulation images are superimposed on brain CT images of SNP model rats to which [$^{18}$F]FHM or [$^{11}$C]HM has been administered.

Hereinafter, forms for implementing the present invention will be described in detail. However, the present invention is not limited to the following embodiments.

[Compound or Salt Thereof]

The compound according to the present embodiment is represented by the following General Formula (1).

[Chem. 3]

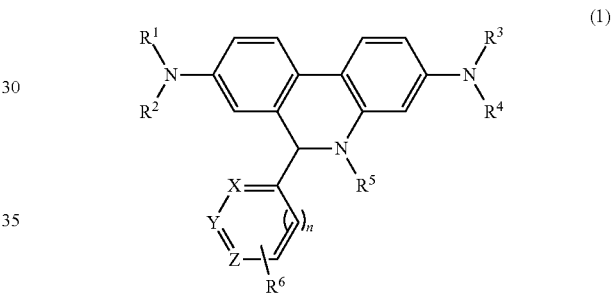

(1)

In General Formula (1), $R^1$, $R^2$, $R^3$ and $R^4$ each independently represent a hydrogen atom, a linear or branched alkyl group which may have a substituent, a linear or branched alkenyl group which may have a substituent, a linear or branched alkynyl group which may have a substituent, a cycloalkyl group which may have a substituent, an aromatic hydrocarbon group which may have a substituent, or a heterocyclic group which may have a substituent.

In General Formula (1), $R^5$ represents —$^{11}CH_3$, a linear or branched alkyl group which may have a substituent, a linear or branched alkenyl group which may have a substituent, a linear or branched alkynyl group which may have a substituent, a cycloalkyl group which may have a substituent, an aromatic hydrocarbon group which may have a substituent, or a heterocyclic group which may have a substituent.

In General Formula (1), $R^6$ represents —F, —$CH_3$, —$^{18}$F or —$^{11}CH_3$. $R^6$ is preferably —F or —$^{18}$F because then the detection sensitivity for reactive oxygen species in the living body becomes higher.

In General Formula (1), X, Y and Z each independently represent a carbon atom, an oxygen atom, a sulfur atom or a nitrogen atom.

In General Formula (1), n is 0 or 1.

The linear or branched alkyl group for $R^1$, $R^2$, $R^3$, $R^4$ and $R^5$ may be, for example, a linear or branched alkyl group having 1 to 20 carbon atoms, a linear or branched alkyl group having 1 to 12 carbon atoms, or a linear or branched alkyl group having 1 to 6 carbon atoms.

Specific examples of linear or branched alkyl groups for $R^1$, $R^2$, $R^3$, $R^4$ and $R^5$ include, for example, a methyl group, ethyl group, n-propyl group, 2-propyl group, n-butyl group, sec-butyl group, 2-methylpropyl group, tert-butyl group, n-pentyl group, 1-methylbutyl group, 1-ethylpropyl group, 1,1-dimethylpropyl group, 1,2-dimethylpropyl group, n-hexyl group, 1-methylpentyl group, 2-methylpentyl group, 3-methylpentyl group, 4-methylpentyl group, 1-ethylbutyl group, 2-ethylbutyl group, 1,1-dimethylbutyl group, 1,2-dimethylbutyl group, 1,3-dimethylbutyl group, 1,4-dimethylbutyl group, 2,2-dimethylbutyl group, 2,3-dimethylbutyl group, 3,3-dimethylbutyl group, 1-ethyl-2-methyl-propyl group, 1,1,2-trimethylpropyl group, n-heptyl group, 2-methylhexyl group, n-octyl group, isooctyl group, tert-octyl group, 2-ethylhexyl group, 3-methylheptyl group, n-nonyl group, isononyl group, 1-methyloctyl group, 2-ethylheptyl group, n-decyl group, 1-methylnonyl group, n-undecyl group, 1,1-dimethylnonyl group, n-dodecyl group, n-tetradecyl group, n-heptadecyl group, and n-octadecyl group.

The linear or branched alkenyl group for $R^1$, $R^2$, $R^3$, $R^4$ and $R^5$ may be, for example, a linear or branched alkenyl group having 2 to 20 carbon atoms, a linear or branched alkenyl group having 2 to 12 carbon atoms, or a linear or branched alkenyl group having 2 to 6 carbon atoms.

Specific examples of linear or branched alkenyl groups for $R^1$, $R^2$, $R^3$, $R^4$ and $R^5$ include, for example, a vinyl group, 1-propenyl group, 2-propenyl group, 2-butenyl group, 3-butenyl group, 3-pentenyl group, 4-pentenyl group, 1-hexenyl group, 5-hexenyl group, and 7-octenyl group.

The linear or branched alkynyl group for $R^1$, $R^2$, $R^3$, $R^4$ and $R^5$ may be, for example, a linear or branched alkynyl group having 2 to 20 carbon atoms, a linear or branched alkynyl group having 2 to 12 carbon atoms, or a linear or branched alkynyl group having 2 to 6 carbon atoms.

Specific examples of linear or branched alkynyl groups for $R^1$, $R^2$, $R^3$, $R^4$ and $R^5$ include, for example, an ethynyl group, 1-propynyl group, 2-propynyl group, 2-butynyl group, 3-butynyl group, 3-pentynyl group, 4-pentynyl group, 1-hexynyl group, and 5-hexynyl group.

The cycloalkyl group for $R^1$, $R^2$, $R^3$, $R^4$ and $R^5$ may be, for example, a cycloalkyl group having 3 to 20 carbon atoms or a cycloalkyl group having 4 to 10 carbon atoms.

Specific examples of cycloalkyl groups for $R^1$, $R^2$, $R^3$, $R^4$ and $R^5$ include a cyclopropyl group, cyclobutyl group, cyclopentyl group, cyclohexyl group, cycloheptyl group, cyclooctyl group, cyclodecyl group, and cyclododecyl group.

The aromatic hydrocarbon group for $R^1$, $R^2$, $R^3$, $R^4$ and $R^5$ is a group obtained by removing one hydrogen atom bonded to a carbon atom constituting a ring from a monocyclic or polycyclic aromatic hydrocarbon group. The aromatic hydrocarbon group for $R^1$, $R^2$, $R^3$, $R^4$ and $R^5$ may be, for example, an aromatic hydrocarbon group having 6 to 60 carbon atoms, an aromatic hydrocarbon group having 6 to 30 carbon atoms, or an aromatic hydrocarbon group having 6 to 18 carbon atoms.

Specific examples of aromatic hydrocarbon groups for $R^1$, $R^2$, $R^3$, $R^4$ and $R^5$ include a phenyl group, naphthyl group, biphenyl group, anthryl group, phenanthryl group, pyrenyl group, triphenylenyl group, indenyl group, and fluorenyl group.

The heterocyclic group for $R^1$, $R^2$, $R^3$, $R^4$ and $R^5$ is a group obtained by removing one hydrogen atom bonded to a carbon atom or a heteroatom constituting a ring from a heterocyclic compound. The heterocyclic group for $R^1$, $R^2$, $R^3$, $R^4$ and $R^5$ may be, for example, a heterocyclic group having 3 to 30 ring constituent atoms (carbon atoms and heteroatoms constituting a ring), a heterocyclic group having 4 to 20 ring constituent atoms, or a heterocyclic group having 5 to 10 ring constituent atoms.

Specific examples of heterocyclic groups for $R^1$, $R^2$, $R^3$, $R^4$ and $R^5$ include a pyridyl group, pyrimidinyl group, triazinyl group, pyrrolyl group, imidazolyl group, pyrazolyl group, triazolyl group, quinolyl group, isoquinolyl group, naphthyridinyl group, indolyl group, benziimidazolyl group, carbazolyl group, carbonyl group, acridinyl group, phenanthrolinyl group, hydantoin group, furanyl group, benzofuranyl group, dibenzofuranyl group, thienyl group, benzothienyl group, dibenzothienyl group, oxazolyl group, benzoxazolyl group, thiazolyl group, and benzothiazolyl group.

The above linear or branched alkyl group, linear or branched alkenyl group, linear or branched alkynyl group, cycloalkyl group, aromatic hydrocarbon group and heterocyclic group may have a substituent.

Examples of substituents include halogen atoms such as a fluorine atom, a chlorine atom, a bromine atom and an iodine atom, an azide group, a sulfo group, a nitro group, a nitroso group, a cyano group, a hydroxy group, a carboxyl group, a thiol group, an unsubstituted amino group, a linear or branched alkyl group having 1 to 20 carbon atoms, a linear or branched alkenyl group having 2 to 20 carbon atoms, a linear or branched alkynyl group having 2 to 20 carbon atoms, a cycloalkyl group having 3 to 20 carbon atoms, an aromatic hydrocarbon group having 6 to 60 carbon atoms, and a heterocyclic group having 3 to 30 ring constituent atoms.

Examples of linear or branched alkyl groups having 1 to 20 carbon atoms for the substituent include a methyl group, ethyl group, n-propyl group, 2-propyl group, n-butyl group, sec-butyl group, 2-methylpropyl group, tert-butyl group, n-pentyl group, 1-methylbutyl group, 1-ethylpropyl group, 1,1-dimethylpropyl group, 1,2-dimethylpropyl group, n-hexyl group, 1-methylpentyl group, 2-methylpentyl group, 3-methylpentyl group, 4-methylpentyl group, 1-ethylbutyl group, 2-ethylbutyl group, 1,1-dimethylbutyl group, 1,2-dimethylbutyl group, 1,3-dimethylbutyl group, 1,4-dimethylbutyl group, 2,2-dimethylbutyl group, 2,3-dimethylbutyl group, 3,3-dimethylbutyl group, 1-ethyl-2-methyl-propyl group, 1,1,2-trimethylpropyl group, n-heptyl group, 2-methylhexyl group, n-octyl group, isooctyl group, tert-octyl group, 2-ethylhexyl group, 3-methylheptyl group, n-nonyl group, isononyl group, 1-methyloctyl group, 2-ethylheptyl group, n-decyl group, 1-methylnonyl group, n-undecyl group, 1,1-dimethylnonyl group, n-dodecyl group, n-tetradecyl group, n-heptadecyl group, and n-octadecyl group.

Examples of linear or branched alkenyl groups having 2 to 20 carbon atoms for the substituent include a vinyl group, 1-propenyl group, 2-propenyl group, 2-butenyl group, 3-butenyl group, 3-pentenyl group, 4-pentenyl group, 1-hexenyl group, 5-hexenyl group, and 7-octenyl group.

The linear or branched alkynyl group having 2 to 20 carbon atoms for the substituent includes, for example, an ethynyl group, 1-propynyl group, 2-propynyl group, 2-butynyl group, 3-butynyl group, 3-pentynyl group, 4-pentynyl group, 1-hexynyl group, and 5-hexynyl group.

Examples of cycloalkyl groups having 3 to 20 carbon atoms for the substituent include a cyclopropyl group, cyclobutyl group, cyclopentyl group, cyclohexyl group, cycloheptyl group, cyclooctyl group, cyclodecyl group, and cyclododecyl group.

Examples of aromatic hydrocarbon groups having 6 to 60 carbon atoms for the substituent include a phenyl group, naphthyl group, biphenyl group, anthryl group, phenanthryl group, pyrenyl group, triphenylenyl group, indenyl group, and fluorenyl group.

Examples of heterocyclic groups having 3 to 30 ring constituent atoms for the substituent include a pyridyl group, pyrimidinyl group, triazinyl group, pyrrolyl group, imidazolyl group, pyrazolyl group, triazolyl group, quinolyl group, isoquinolyl group, naphthyridinyl group, indolyl group, benziimidazolyl group, carbazolyl group, carbonyl group, acridinyl group, phenanthrolinyl group, hydantoin group, furanyl group, benzofuranyl group, dibenzofuranyl group, thienyl group, benzothienyl group, dibenzothienyl group, oxazolyl group, benzoxazolyl group, thiazolyl group, and benzothiazolyl group.

Only one of these substituents may be contained or a plurality thereof may be contained, and when a plurality of substituents are contained, they may be the same as or different from each other. In addition, these substituents may include the substituents exemplified above, and moreover, these substituents may be bonded to each other via a single bond, a substituted or unsubstituted methylene group, an oxygen atom or a sulfur atom to form a ring.

In General Formula (1), $R^1$ and $R^2$ may be bonded to each other to form a ring. Similarly, in General Formula (1), $R^3$ and $R^4$ may be bonded to each other to form a ring. In addition, in General Formula (1), $R^1$ and/or $R^2$ may be bonded to a 6-membered ring to which —$NR^1R^2$ is bonded to form a ring. Similarly, in General Formula (1), $R^3$ and/or $R^4$ may be bonded to a 6-membered ring to which —$NR^3R^4$ is bonded to form a ring.

In the compound represented by General Formula (1), it is preferable that $R^1$, $R^2$, $R^3$ and $R^4$ not be all a hydrogen atom, and it is more preferable that $R^1$ and $R^3$ not be both a hydrogen atom. That is, in the compound represented by General Formula (1), at least one of $R^1$, $R^2$, $R^3$ and $R^4$ is preferably a linear or branched alkyl group which may have a substituent, a linear or branched alkenyl group which may have a substituent, a linear or branched alkynyl group which may have a substituent, a cycloalkyl group which may have a substituent, an aromatic hydrocarbon group which may have a substituent, or a heterocyclic group which may have a substituent, and more preferably, $R^1$ and $R^3$ each independently represent a linear or branched alkyl group which may have a substituent, a linear or branched alkenyl group which may have a substituent, a linear or branched alkynyl group which may have a substituent, a cycloalkyl group which may have a substituent, an aromatic hydrocarbon group which may have a substituent, or a heterocyclic group which may have a substituent. A compound having this configuration is less likely to cause intercalation with DNA. When intercalation of a compound into DNA occurs, the compound may exhibit mutagenicity. Therefore, the compound having the above configuration is thought to be safer for a living body.

The compound represented by General Formula (1) may be, for example, a compound represented by the following General Formula (1-1) or General Formula (1-2).

[Chem. 4]

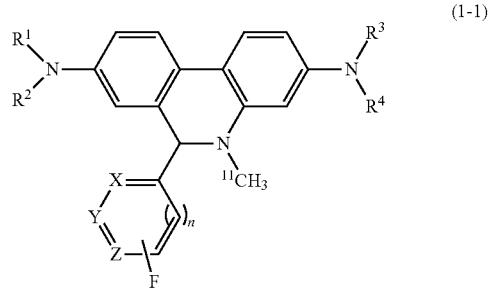

(1-1)

[Chem. 5]

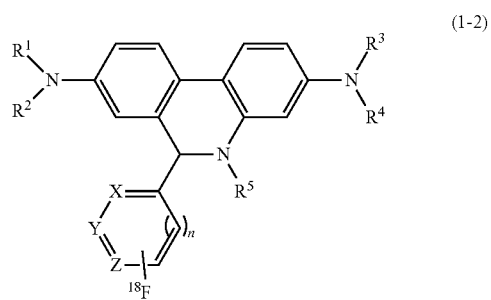

(1-2)

In General Formula (1-1) and General Formula (1-2), $R^1$, $R^2$, $R^3$, $R^4$, $R^5$, X, Y, Z and n have the same meanings as those in General Formula (1).

Specific examples of compounds represented by General Formula (1) include compounds represented by Formula (A1) to Formula (A22), but the present invention is not limited thereto.

[Chem. 6]

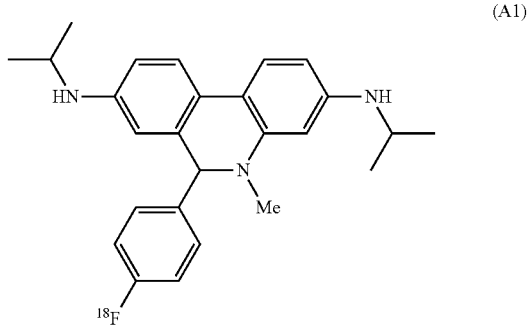

(A1)

[Chem. 7]

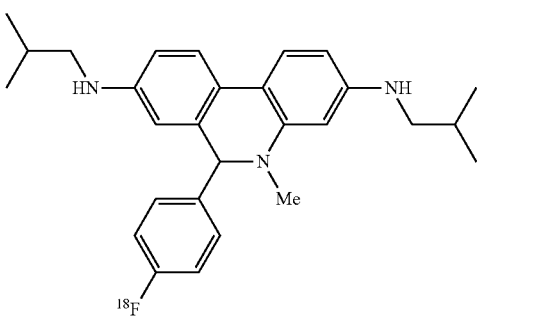

(A2)

[Chem. 8]
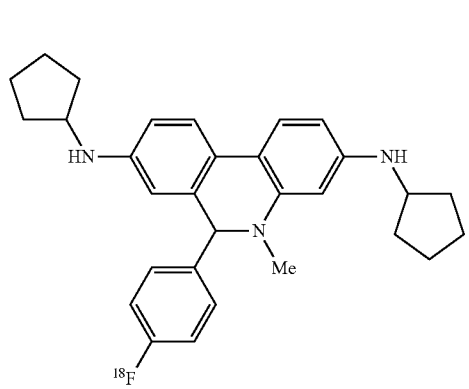
(A3)
[Chem. 9]
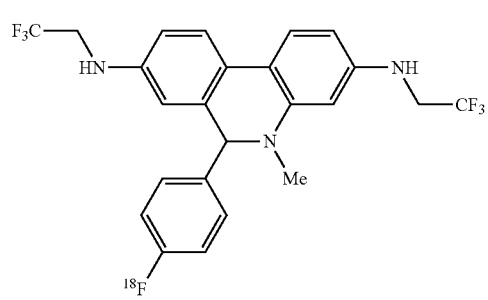
(A4)
[Chem. 10]
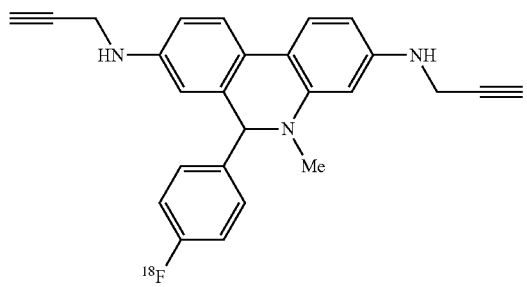
(A5)
[Chem. 11]
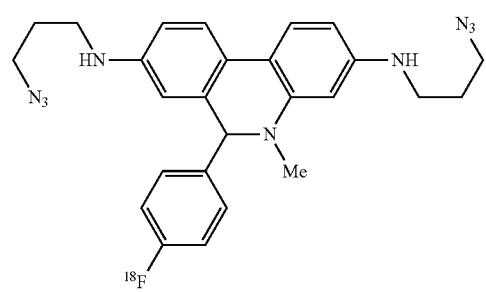
(A6)
[Chem. 12]
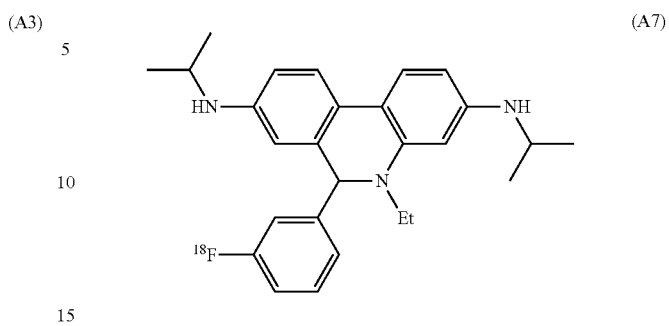
(A7)
[Chem. 13]
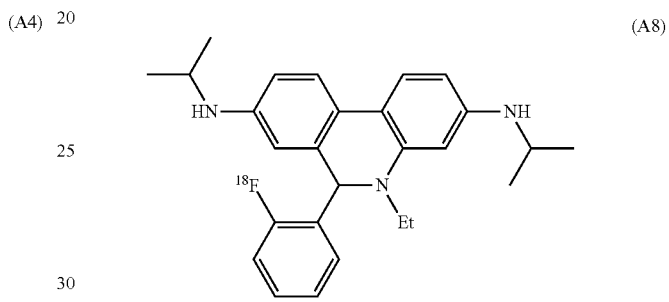
(A8)
[Chem. 14]
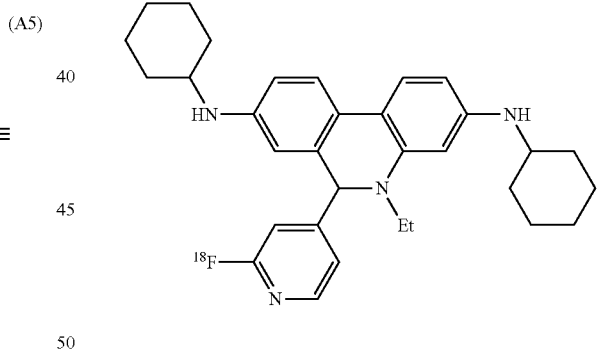
(A9)
[Chem. 15]
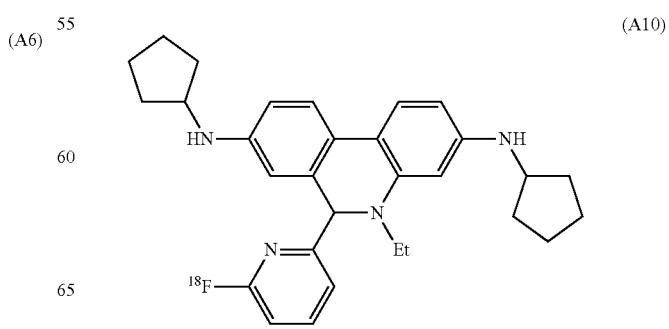
(A10)

[Chem. 16]
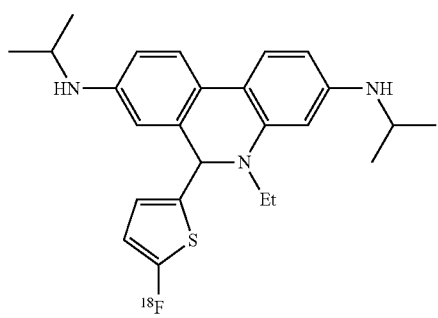
(A11)
[Chem. 17]
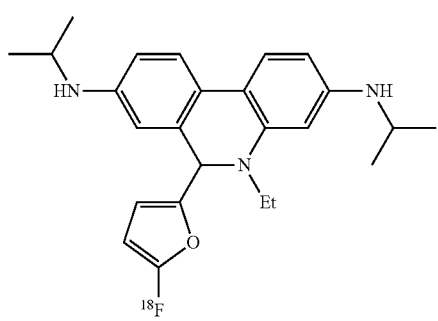
(A12)
[Chem. 18]
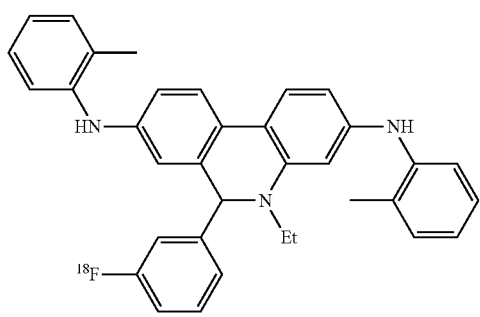
(A13)
[Chem. 19]
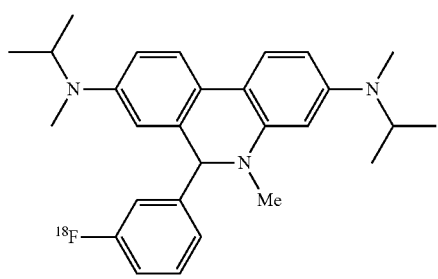
(A14)
[Chem. 20]
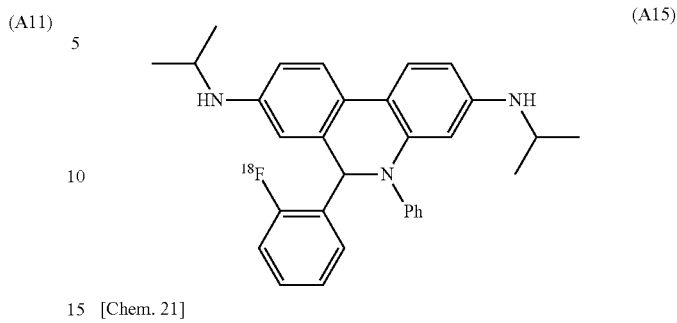
(A15)
[Chem. 21]
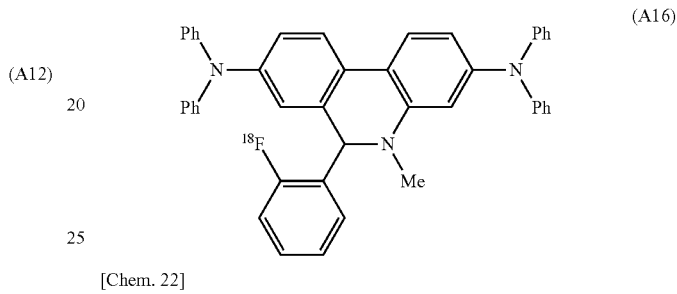
(A16)
[Chem. 22]
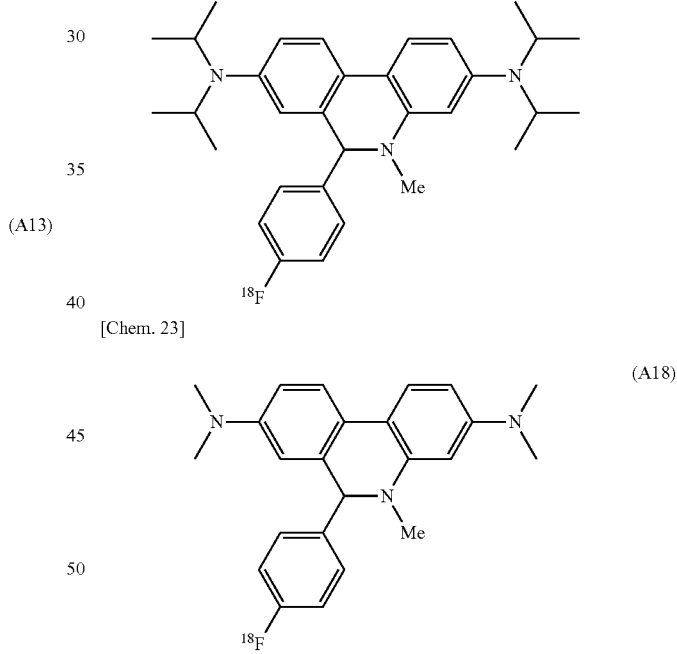
(A17)
[Chem. 23]
(A18)
[Chem. 24]
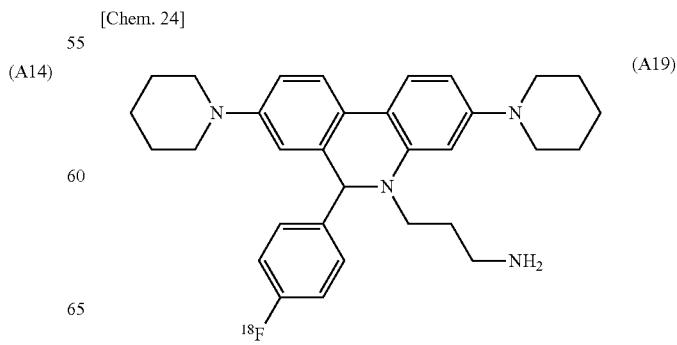
(A19)

[Chem. 25]

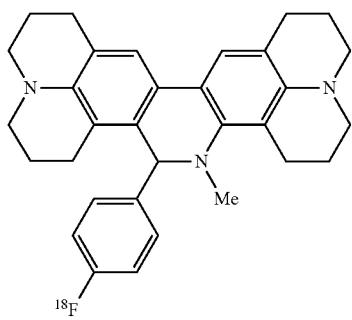

(A20)

[Chem. 26]

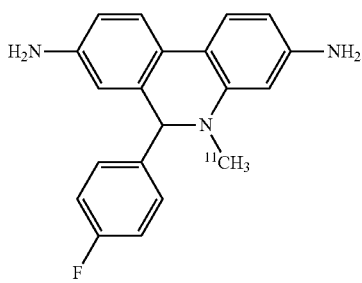

(A21)

[Chem. 27]

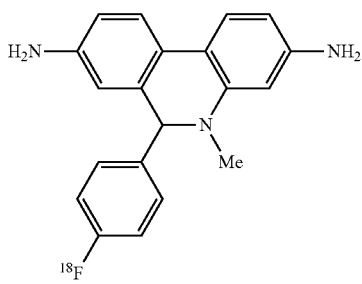

(A22)

The salt of the compound represented by General Formula (1) is not particularly limited as long as it is pharmacologically acceptable. Examples of salts of the compound represented by General Formula (1) include a salt of an organic acid, a salt of an inorganic acid, a salt of an organic base, and a salt of an inorganic base.

Examples of salts of an organic acid include an acetate, trifluoroacetate, fumarate, maleate, lactate, tartrate, citrate, and methanesulfonate. Examples of salts of an inorganic acid include a hydrochloride, sulfate, nitrate, hydrobromate, and phosphate. Examples of salts of an organic base include a salt of triethanolamine. Examples of salts of an inorganic base include an ammonium salt, a sodium salt, a potassium salt, a calcium salt, and a magnesium salt.

[Precursor Compound]

The compound represented by General Formula (1) or a salt thereof can be obtained by reacting, for example, the compound represented by the following General Formula (2) or a salt thereof (precursor compound) with KF or $K^{18}F$ in the presence of a $Cu(OTf)_2(Py)_4$ catalyst. In addition, the compound represented by General Formula (1) or a salt thereof can be obtained by reacting, for example, the compound represented by the following General Formula (2) or a salt thereof (precursor compound) with $CH_3I$ or $^{11}CH_3I$ in the presence of a $Pd_2(dba)_3$ catalyst.

[Chem. 28]

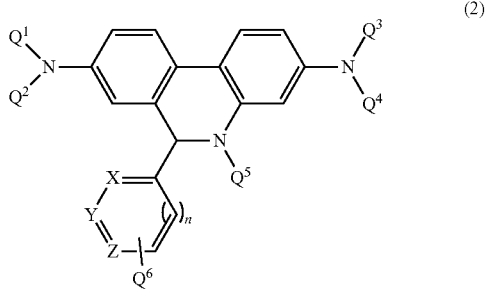

(2)

In General Formula (2), $Q^1$, $Q^2$, $Q^3$ and $Q^4$ each independently represent a hydrogen atom, a tert-butyloxycarbonyl group (Boc group), a benzyloxycarbonyl group (Cbz group), a linear or branched alkyl group which may have a substituent, a linear or branched alkenyl group which may have a substituent, a linear or branched alkynyl group which may have a substituent, a cycloalkyl group which may have a substituent, an aromatic hydrocarbon group which may have a substituent, or a heterocyclic group which may have a substituent.

In General Formula (2), $Q^5$ represents $-^{11}CH_3$, a tert-butyloxycarbonyl group (Boc group), a benzyloxycarbonyl group (Cbz group), a linear or branched alkyl group which may have a substituent, a linear or branched alkenyl group which may have a substituent, a linear or branched alkynyl group which may have a substituent, a cycloalkyl group which may have a substituent, an aromatic hydrocarbon group which may have a substituent, or a heterocyclic group which may have a substituent.

Specific forms of a linear or branched alkyl group which may have a substituent, a linear or branched alkenyl group which may have a substituent, a linear or branched alkynyl group which may have a substituent, a cycloalkyl group which may have a substituent, an aromatic hydrocarbon group which may have a substituent, and a heterocyclic group which may have a substituent for $Q^1$, $Q^2$, $Q^3$, $Q^4$ and $Q^5$ are the same as forms described for $R^1$, $R^2$, $R^3$, $R^4$ and $R^5$.

In General Formula (2), $Q^6$ represents a boronic acid group, a boronic acid ester group, a trifluoroborate base or a triolborate base. The boronic acid group, boronic acid ester group, trifluoroborate base or triolborate base is not particularly limited, and examples thereof include those represented by the following structural formula.

[Chem. 29]

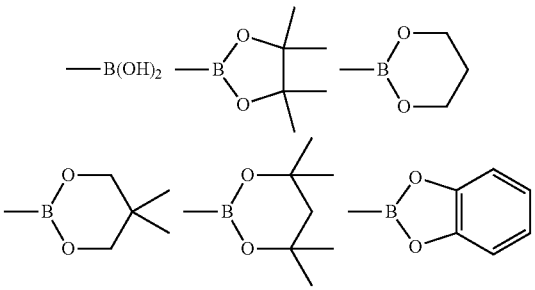

-continued

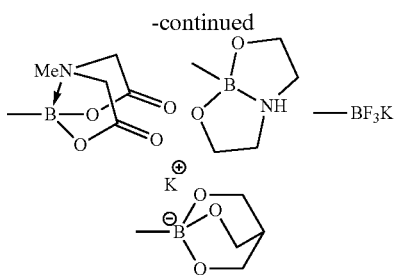

In General Formula (2), X, Y and Z each independently represent a carbon atom, an oxygen atom, a sulfur atom or a nitrogen atom.

In General Formula (2), n is 0 or 1.

In General Formula (2), $Q^1$ and $Q^2$ may be bonded to each other to form a ring. Similarly, in General Formula (2), $Q^3$ and $Q^4$ may be bonded to each other to form a ring. In addition, in General Formula (2), $Q^1$ and/or $Q^2$ may be bonded to a 6-membered ring to which —$NQ^1Q^2$ is bonded to form a ring. Similarly, in General Formula (2), $Q^3$ and/or $Q^4$ may be bonded to a 6-membered ring to which —$NQ^3Q^4$ is bonded to form a ring.

Specific examples of the compound represented by General Formula (2) include the compound represented by Formula (B1) or Formula (B22), but the present invention is not limited thereto.

[Chem. 30]

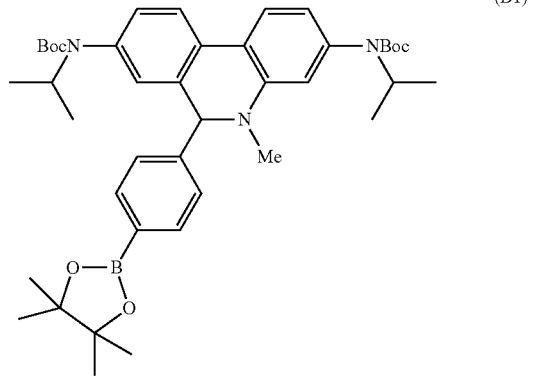

(B1)

[Chem. 31]

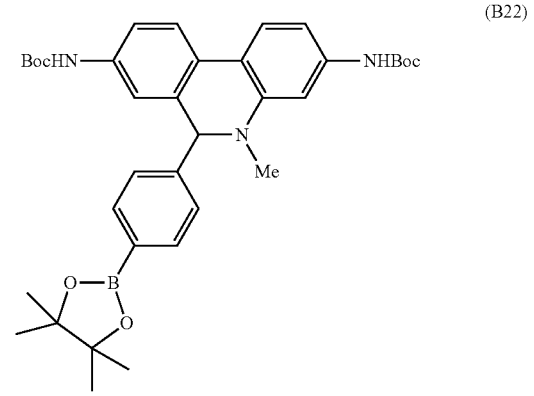

(B22)

The salt of the precursor compound is not particularly limited as long as it is pharmacologically acceptable. Examples of salts of precursor compounds include a salt of an organic acid, a salt of an inorganic acid, a salt of an organic base, and a salt of an inorganic base.

Examples of salts of an organic acid include acetate, trifluoroacetate, fumarate, maleate, lactate, tartrate, citrate, and methanesulfonate. Examples of salts of an inorganic acid include hydrochloride, sulfate, nitrate, hydrobromate, and phosphate. Examples of salts of an organic base include a salt of triethanolamine. Examples of salts of an inorganic base include an ammonium salt, a sodium salt, a potassium salt, a calcium salt, and a magnesium salt.

The precursor compound or a salt thereof can be produced, for example, according to the synthesis scheme described in examples to be described below.

[Reactive Oxygen Species Imaging Agent/Reactive Oxygen Species Imaging Method]

The compound represented by General Formula (1) or a salt thereof is reacted with reactive oxygen species and converted into a compound represented by General Formula (1R) or a salt thereof.

[Chem. 32]

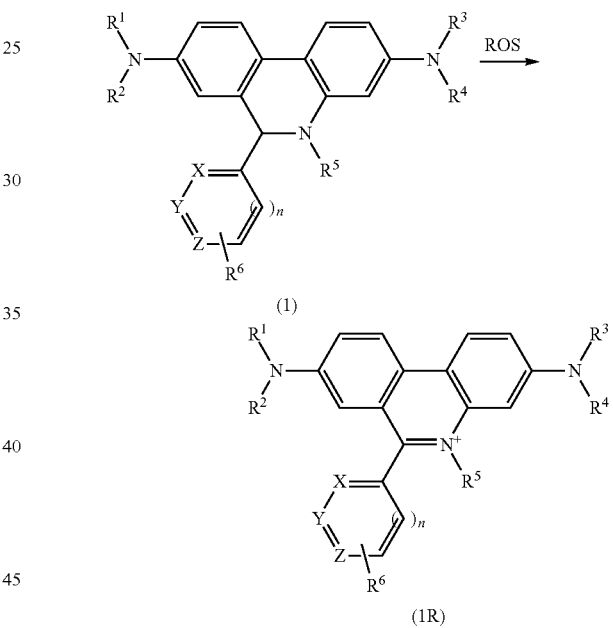

While the compound represented by General Formula (1) or a salt thereof can pass through the cell membrane relatively freely, it is difficult for the compound represented by General Formula (1R) or a salt thereof to pass through the cell membrane. Therefore, when the compound represented by General Formula (1) or a salt thereof reacts with reactive oxygen species in a cell, it remains as the compound represented by General Formula (1R) or a salt thereof in the cell. Therefore, when the compound represented by General Formula (1) or a salt thereof (specifically, the compound represented by General Formula (1R) or a salt thereof) is detected, a site (cell) in which reactive oxygen species are produced can be imaged. In addition, since the accumulated amount of the compound represented by General Formula (1) or a salt thereof (specifically, the compound represented by General Formula (1R) or a salt thereof) correlates with the amount of reactive oxygen species, the amount of reactive oxygen species produced can be quantified by quantifying the accumulated amount.

Therefore, the compound represented by General Formula (1) or a salt thereof may be suitable for use in imaging of reactive oxygen species. That is, one embodiment of the present invention provides a reactive oxygen species imaging agent containing a compound represented by General Formula (1) or a salt thereof as an active ingredient. Specific forms of a reactive oxygen species imaging agent according to the present embodiment may be a PET probe or a fluorescence probe.

The reactive oxygen species imaging agent according to the present embodiment can be produced by, for example, dissolving the compound represented by General Formula (1) or a salt thereof in an arbitrary buffer solution. In this case, the reactive oxygen species imaging agent according to the present embodiment is provided as a solution, and may contain other components such as a surfactant, a preservative, and a stabilizer in addition to the buffer component.

The reactive oxygen species that can be imaged are not particularly limited, and examples thereof include superoxide anions, hydroxyl radicals, and hydrogen peroxide.

The method of imaging reactive oxygen species using the reactive oxygen species imaging agent according to the present embodiment includes, for example, a process in which a reactive oxygen species imaging agent according to the present invention is administered to a subject in need thereof, and a process in which a compound represented by General Formula (1) or a salt thereof that has reacted with reactive oxygen species in a living body is detected. The imaging method may further include a process in which, at the site of interest in the living body, the accumulated amount of the compound represented by General Formula (1) or a salt thereof that has reacted with reactive oxygen species in the living body is quantitatively analyzed.

Examples of subjects include humans, monkeys, mice and rats, but the present invention is not limited thereto.

A method of administering a reactive oxygen species imaging agent to subjects is not particularly limited as long as the compound represented by General Formula (1) or a salt thereof reaches the site of interest in the living body, but the agent is generally intravenously administered.

As the site of interest in the living body, the site at which reactive oxygen species are to be imaged can be arbitrarily set. Specific examples of the site of interest in the living body include organs having a large mitochondria content, for example, the brain, heart, pancreas, and muscle.

The dose of the reactive oxygen species imaging agent is not particularly limited as long as it is sufficient to detect the compound represented by General Formula (1) or a salt thereof that has reacted with reactive oxygen species at the site of interest in a living body, and may be appropriately set according to an administration target subject, and a method of detecting the compound represented by General Formula (1) or a salt thereof that has reacted with reactive oxygen species in the living body.

For example, when detection is performed by a device used for positron emission tomography (PET), the dose of the reactive oxygen species imaging agent (hereinafter also referred to as an "administered radioactivity amount") may be 1 MBq/kg body weight to 1,000 MBq/kg body weight. The specific radioactivity of the compound represented by General Formula (1) or a salt thereof may be 10 to 10,000 GBq/μmol. In addition, the administered radioactivity amount of the reactive oxygen species imaging agent depends on the sensitivity of a PET camera used and the volume of individual subjects, but in rodents (mice and rats), about 200 to 500 MBq/kg body weight is administered as 0.1 to 0.5 mL of an aqueous saline solution. For non-human primates (monkeys), 40 to 200 MBq/kg body weight is administered as 0.5 to 2 mL of a saline, and for humans, 2 to 10 MBq/kg body weight is administered as 1 to 5 mL of an aqueous saline solution.

In addition, for example, if detection is performed by a device used for fluorescence detection, the dose of the reactive oxygen species imaging agent may be 1 mg/kg body weight to 10 mg/kg body weight.

A method of measuring the accumulated amount of the compound represented by General Formula (1) or a salt thereof that has reacted with reactive oxygen species in the living body can be appropriately selected according to a specific structure of the compound represented by General Formula (1) or a salt thereof. For example, when the compound represented by General Formula (1) or a salt thereof contains $^{18}$F or $^{11}$C, the compound represented by General Formula (1) or a salt thereof that has reacted with reactive oxygen species in the living body can be detected by a PET method. A measurement method in the PET method is not particularly limited, and can be performed according to a known method. In addition, for example, as a method of performing measurement by a PET method, dynamic measurement may be performed for 60 minutes immediately after the reactive oxygen species imaging agent is administered, and emission measurement may be performed, or after the reactive oxygen species imaging agent is administered, waiting may be performed for 30 to 40 minutes, until the compound represented by General Formula (1) or a salt thereof that has reacted with reactive oxygen species in the living body has sufficiently accumulated at the site (cell) in which reactive oxygen species are produced, and PET measurement may then be performed for 10 to 20 minutes.

In addition, when the compound represented by General Formula (1) or a salt thereof, and the compound represented by General Formula (1R) or a salt thereof emit fluorescence (excitation wavelength of 355 to 536 nm, fluorescence wavelength of 420 to 605 nm), the compound represented by General Formula (1) or a salt thereof that has reacted with reactive oxygen species in the living body can be detected according to fluorescence detection. The measurement method in fluorescence detection is not particularly limited, and can be performed according to a known method.

A method of quantitatively analyzing the accumulated amount of the compound represented by General Formula (1) or a salt thereof that has reacted with reactive oxygen species in the living body at the site of interest in the living body is not particularly limited, and the quantitative analyzing can be performed according to a known method. For example, the following methods may be exemplified. First, an accumulation image of the compound represented by General Formula (1) or a salt thereof that has reacted with reactive oxygen species obtained by the PET method and a morphological image of the site of interest in the living body obtained by CT measurement or the like are superimposed to identify the PET image of the site of interest in the living body. Next, a region of interest is set on the PET image of the site of interest in the living body, and a value normalized according to the body weight of an individual subject and the administered radioactivity amount is used as the accumulated amount of the compound represented by General Formula (1) or a salt thereof that has reacted with reactive oxygen species at the site of interest in the living body.

When the measured accumulated amount is compared with, for example, a reference value, it is possible to determine whether the amount of reactive oxygen species produced has increased at the site of interest in the living body. The reference value may be appropriately set according to the purpose of implementing the method and the like. For example, for the purpose of presymptomatic diagnosis and early diagnosis of brain neurodegenerative diseases, the accumulated amounts of the compound represented by General Formula (1) or a salt thereof that has reacted with reactive oxygen species in the brain (striatum, etc.) are periodically measured for individual subjects, and an average value thereof for a predetermined period (for example, the previous one month to one year) may be set as a reference value. In addition, for example, based on the accumulated amount data of the compound represented by General Formula (1) or a salt thereof that has reacted with the reactive oxygen species obtained from an unspecified large number of subjects in a regular health examination or the like, the average value of the subjects grouped by age or the like can be used as a reference value. In addition, for example, from the accumulated amount data of the compound represented by General Formula (1) or a salt thereof that has reacted with reactive oxygen species obtained from healthy subjects and patients with brain neurodegenerative diseases, an accumulated amount that can distinguish them may be used as a reference value.

For example, when the value of the accumulated amount of the compound represented by General Formula (1) or a salt thereof that has reacted with reactive oxygen species is larger than the above reference value, it can be determined that the amount of ROS produced in subjects increases, and the risk of developing brain neurodegenerative diseases is high, or brain neurodegenerative diseases have developed.

For example, nerve cell damage due to many neurodegenerative diseases such as Parkinson's disease and Alzheimer's disease is thought to be caused by ROS produced according to mitochondria function disorders, and the production of the ROS is thought to be caused earlier than the onset of these diseases. According to the reactive oxygen species imaging agent of the present invention, since the amount of ROS produced in the early stage of nerve cell damage can be measured, these diseases can be diagnosed at an earlier stage.

The above reactive oxygen species imaging agent/reactive oxygen species imaging method according to the present invention can be considered as the compound represented by General Formula (1) or a salt thereof for use in imaging of reactive oxygen species, and also considered as use of the compound represented by General Formula (1) or a salt thereof for production of the reactive oxygen species imaging agent.

EXAMPLES

Hereinafter, the present invention will be described in more detail with reference to examples. However, the present invention is not limited to the following examples.

Test Example 1: Synthesis of Precursor Compound

A precursor (compound represented by Formula (B1)) of a compound represented by Formula (A1) (hereinafter referred to as "[$^{18}$F]FPHM") and a precursor (compound represented by Formula (B22)) of a compound represented by Formula (A22) (hereinafter referred to as "[$^{18}$F]FHM") were synthesized.

[Chem. 33]

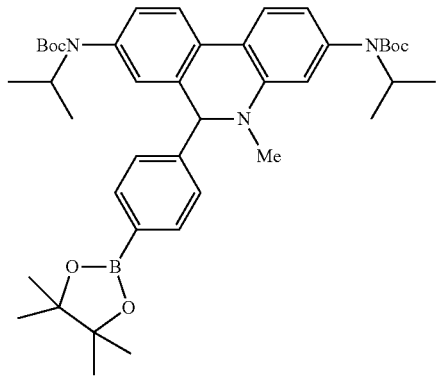

(B1)

[Chem. 34]

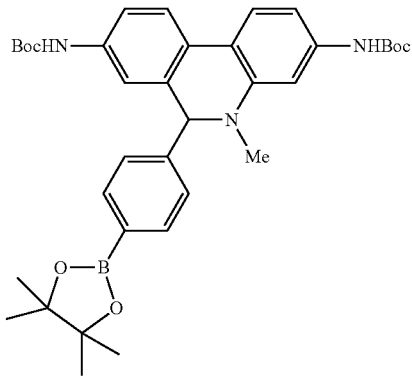

(B22)

Synthesis schemes of precursors of [$^{18}$F]FPHM and [$^{18}$F]FHM are shown below.

[Chem. 35]

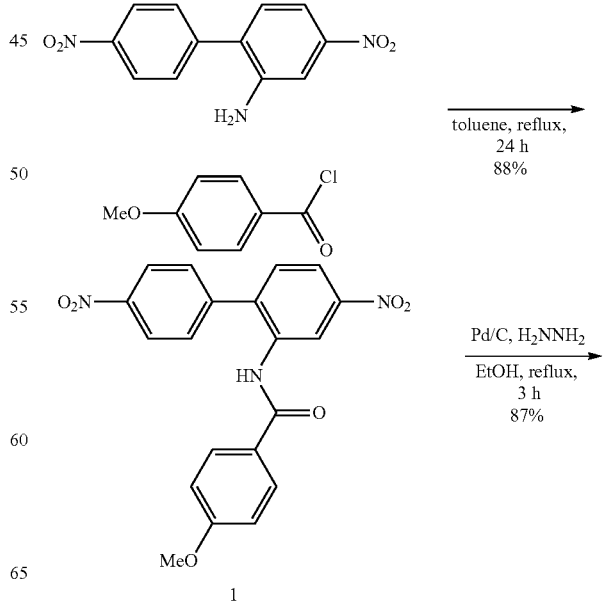

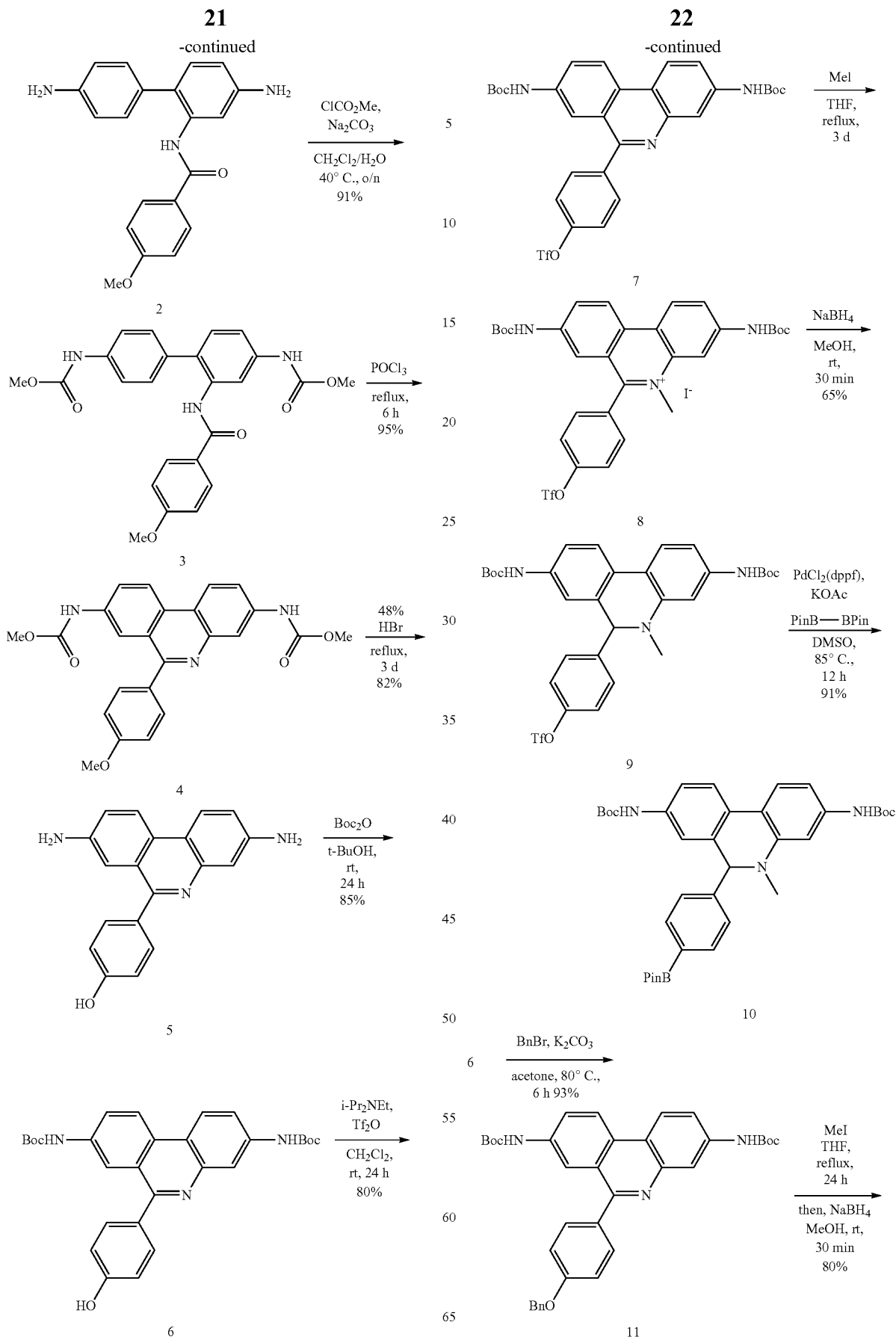

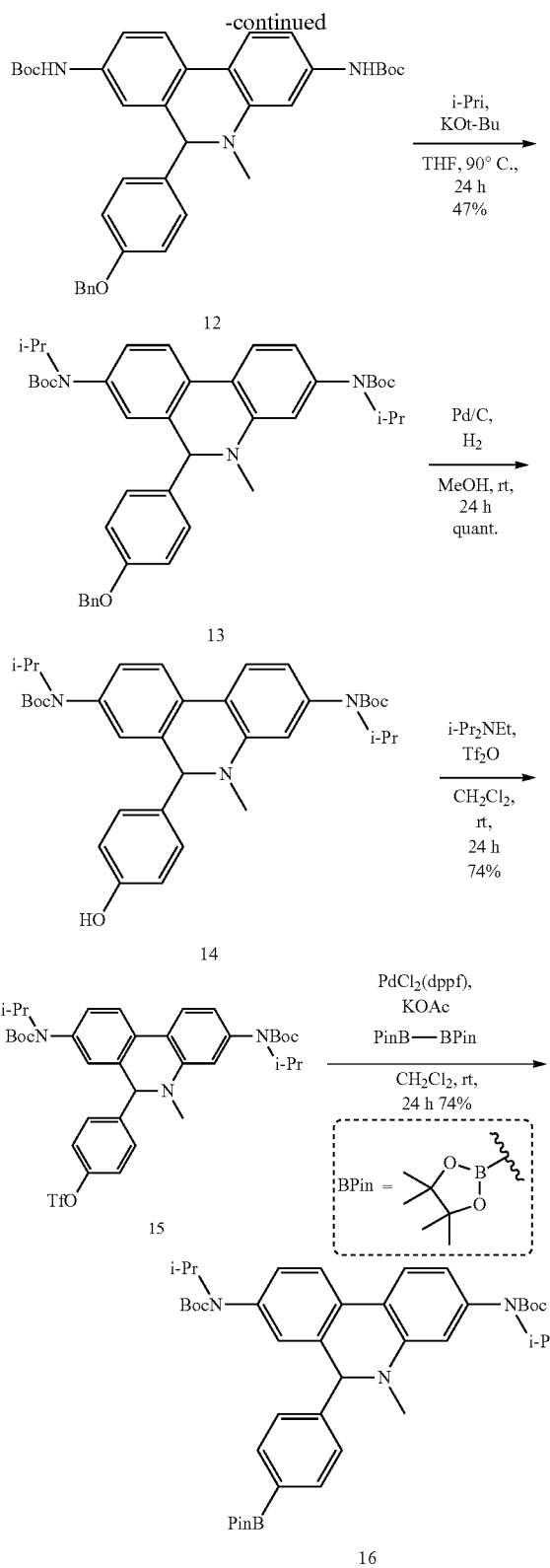

[Synthesis of Precursor of [$^{18}$F]FHM]
(Process 1: Synthesis of Compound 1)

Under an argon atmosphere, 4,4'-dinitrobiphenylamine (10.37 g) was dissolved in toluene (100 mL), and 4-methoxybenzoyl chloride (8.5 g) was added. The mixture was refluxed and stirred at 125° C. for 24 hours. The obtained solid was collected, and washed with ether and warm methanol (50° C.). The obtained solid was sufficiently dried in a vacuum to obtain Compound 1 (13.8 g) as an ocher solid. The measurement results of NMR of Compound 1 are as shown below.

$^1$H-NMR (500 MHz, DMSO-d$_6$): δ=10.26 (s, 1H), 8.49 (d, J=2.3 Hz, 1H), 8.32 (d, J=8.9 Hz, 2H), 2.26 (dd, J=2.3, 8.3 Hz, 1H), 7.83-7.77 (m, 5H), 7.05 (d, J=8.9 Hz, 2H), 3.85 (s, 3H)

$^{13}$C-NMR (125 MHz, DMSO-d$_6$): δ=166.1, 163.1, 148.3, 148.0, 145.6, 142.4, 137.6, 132.7, 130.8, 130.6, 126.7, 124.6, 122.9, 121.8, 114.7, 56.4

(Process 2: Synthesis of Compound 2)

Compound 1 (3.9 g) was dissolved in ethanol (50 mL), and 10% palladium carbon (190 mg) was added thereto. This solution was cooled to 0° C., and hydrazine monohydrate (500 mg) was added dropwise. Then, the mixture was heated and refluxed at 90° C. for 3 hours. The reaction liquid was filtered through Celite, and concentrated under a reduced pressure. The obtained solid was dissolved in ethyl acetate and washed with a saturated sodium bicarbonate aqueous solution, water, and a saturated saline solution using a separatory funnel. Sodium sulfate was added to the obtained organic layer, drying was performed, and a drying agent was then removed through filtration. The solvent of the filtrate was removed under a reduced pressure, and purification was performed through silica gel flash column chromatography (hexane:ethyl acetate=1:1) to obtain Compound 2 (2.9 g) as a yellow solid. The measurement results of NMR of Compound 2 are as shown below.

$^1$H-NMR (500 MHz, DMSO-d$_6$): δ=9.20 (s, 1H), 7.79 (d, J=8.6 Hz, 2H), 7.06-6.98 (m, 5H), 6.87 (brs, 1H), 6.55 (d, J=8.6 Hz, 2H), 6.53 (dd, J=2.3, 8.6 Hz, 1H), 5.10 (brs, 4H), 3.84 (s, 3H)

$^{13}$C-NMR (125 MHz, DMSO-d$_6$): δ=165.6, 162.6, 148.4, 147.9, 136.0, 131.0, 130.1, 130.0, 128.0, 127.8, 126.4, 114.7, 114.5, 113.3, 113.0, 56.3

(Process 3: Synthesis of Compound 3)

Sodium carbonate (3.4 g), dichloromethane (80 mL), water (80 mL), and methyl formate chloride (3.0 g) were added to Compound 2 (2.60 g), and the mixture was stirred at room temperature for 24 hours. The organic layer was washed with water and a saturated saline solution, sodium sulfate was added, and the mixture was dried. The drying agent was removed through filtration, the solvent was then distilled off under a reduced pressure, and purification was performed through silica gel flash column chromatography (hexane:ethyl acetate=1:1) to obtain Compound 3 (3.34 g) as a white solid. The measurement results of NMR of Compound 3 are as shown below.

$^1$H-NMR (500 MHz, DMSO-d$_6$): δ=9.83 (brs, 1H), 9.70 (brs, 1H), 9.69 (brs, 1H), 7.83 (d, J=8.9 Hz, 2H), 7.61 (s, 1H), 7.50-7.44 (m, 3H), 7.34 (d, J8.6 Hz, 2H), 7.32 (d, J=8.6 Hz, 1H), 7.03 (d, J=8.9 Hz, 2H), 3.85 (s, 3H), 3.72 (s, 3H), 3.68 (s, 3H)

$^{13}$C-NMR (125 MHz, DMSO-d$_6$): δ=166.1, 162.8, 155.0, 139.5, 138.9, 136.2, 134.0, 133.0, 131.3, 130.4, 129.9, 127.5, 118.9, 117.4, 114.6, 56.4, 52.7, 52.6

(Process 4: Synthesis of Compound 4)

Compound 3 (970 mg) and phosphoryl chloride (9 mL) were mixed, and the mixture was heated, refluxed and stirred at 120° C. for 6 hours. Then, while the reaction solution was cooled, it was neutralized using sodium hydroxide and sodium carbonate so that the pH was 8.0, and organic substances were extracted with ethyl acetate. The extraction liquid was washed with water and a saturated saline solution, sodium sulfate was then added to the obtained organic layer, and the mixture was dried. The drying agent was removed through filtration, the solvent was then removed under a reduced pressure, and purification was performed through silica gel flash column chromatography (hexane:ethyl acetate=1:1) to obtain Compound 4 (860 mg) as a yellow solid. The measurement results of NMR of Compound 4 are as shown below.

$^1$H-NMR (500 MHz, DMSO-$d_6$): δ=10.10 (brs, 1H), 10.08 (brs, 1H), 8.76 (d, J=9.2 Hz, 1H), 8.65 (d, J=9.2 Hz, 1H), 8.40 (s, 1H), 8.24 (d, J=2.0 Hz, 1H), 7.99 (dd, J=2.0, 9.2 Hz, 1H), 7.81 (dd, J=2.0. 9.2 Hz, 1H), 7.71 (d, J=8.6 Hz, 2H), 7.18 (d, J=8.6 Hz, 2H), 3.92 (s, 3H), 3.77 (s, 3H), 3.71 (s, 3H)

$^{13}$C-NMR (125 MHz, DMSO-$d_6$): δ=161.1, 160.7, 155.1, 144.4, 140.2, 138.8, 132.9, 132.1, 129.3, 125.5, 124.2, 123.8, 123.7, 119.7, 119.4, 117.4, 116.2, 114.7, 56.3, 52.9, 52.9

(Process 5: Synthesis of Compound 5)

Compound 4 (860 mg) and 48% hydrobromic acid were mixed, and the mixture was heated and refluxed at 140° C. for 24 hours. Then, while the reaction solution was cooled, it was neutralized using sodium hydroxide and sodium carbonate so that the pH was 8.0, and organic substances were extracted with ethyl acetate. The extraction liquid was washed with water and a saturated saline solution, sodium sulfate was then added to the obtained organic layer, and the mixture was dried. The drying agent was removed through filtration, the solvent was then removed under a reduced pressure, and purification was performed through silica gel flash column chromatography (ethyl acetate) to obtain Compound 5 (540 mg) as a brown solid. The measurement results of NMR of Compound 5 are as shown below.

$^1$H-NMR (500 MHz, DMSO-$d_6$): δ=9.77 (s, 1H), 8.34 (d, J=9.0 Hz, 1H), 8.24 (d, J=8.6 Hz, 1H), 7.48 (d, J=8.6 Hz, 2H), 7.18 (dd, J=2.3, 8.6 Hz, 1H), 7.09 (d, J=2.3 Hz, 1H), 7.06 (d, J=2.3 Hz, 1H), 6.99 (dd, J=2.3, 9.0 Hz, 1H), 6.96 (d, J=8.6 Hz, 2H), 5.42 (brs, 2H), 5.38 (brs, 2H)

$^{13}$C-NMR (125 MHz, DMSO-$d_6$): δ=160.1, 158.5, 148.7, 147.3, 144.5, 132.3, 131.8, 125.8, 125.7, 123.3, 122.8, 121.7, 117.9, 115.9, 115.8, 111.1, 109.4

(Process 6: Synthesis of Compound 6)

Compound 5 (409 mg) and di-tert-butyl dicarbonate (Boc$_2$O, 916 mg) were dissolved in tert-butyl alcohol (25 mL) and stirred at 40° C. for 24 hours. After returning to room temperature, the sample was concentrated under a reduced pressure, and purification was performed through silica gel flash column chromatography (hexane:ethyl acetate=3:1) to obtain Compound 6 (574 mg) as a white solid. The measurement results of NMR of Compound 6 are as shown below.

$^1$H-NMR (500 MHz, DMSO-$d_6$): δ=9.87 (brs, 1H), 9.76 (brs, 1H), 9.74 (brs, 1H), 8.71 (d, J=9.2 Hz, 1H), 8.60 (d, J=9.2 Hz, 1H), 8.34 (s, 1H), 8.19 (s, 1H), 8.02 (d, J=9.2 Hz, 1H), 7.80 (d, J=9.2 Hz, 1H), 7.59 (d, J=8.0 Hz, 2H), 6.99 (d, J=8.0 Hz, 2H), 1.56 (s, 9H), 1.50 (s, 9H)

$^{13}$C-NMR (125 MHz, DMSO-$d_6$): δ=161.1, 158.9, 153.8, 144.3, 140.4, 139.0, 132.1, 131.3, 129.1, 125.4, 123.9, 123.6, 123.5, 119.5, 119.1, 117.2, 115.9, 80.4, 29.1, 29.1

(Process 7: Synthesis of Compound 7)

Under an argon atmosphere, Compound 6 (574 mg) was dissolved in dichloromethane (11.4 mL), and N,N-diisopropylethylamine (588 mg) was added dropwise at 0° C. The mixture was stirred at room temperature for 30 minutes, and then cooled to 0° C. again, and trifluoromethanesulfonic anhydride (Tf$_2$O, 643 mg) was added dropwise. The mixture was stirred at room temperature for 18 hours, and the reaction was then stopped with a saturated ammonium chloride aqueous solution. After extraction was performed using dichloromethane, washing with a saturated saline solution was performed, sodium sulfate was added to the collected organic layer, and drying was performed. The drying agent was removed through filtration, the filtrate was concentrated under a reduced pressure, and the remaining residue was purified through silica gel flash column chromatography (hexane:ethyl acetate=3:1) to obtain Compound 7 (580 mg) as a yellow solid. The measurement results of NMR, IR, and MS of Compound 7 are as shown below.

$^1$H-NMR (500 MHz, CDCl$_3$): δ=8.52-8.49 (m, 1H), 8.43-8.40 (m, 1H), 8.03 (brs, 1H), 7.94-7.92 (m, 2H), 7.82-7.80 (m, 2H), 7.76 (s, 1H), 7.46-7.44 (m, 2H), 6.81 (brm, 2H), 1.56 (s, 9H), 1.51 (s, 9H)

$^{13}$C-NMR (125 MHz, CDCl$_3$): δ=158.8, 152.7, 149.7, 143.4, 139.9, 138.6, 137.1, 131.6, 129.0, 124.5, 123.2, 122.9, 122.4, 121.3, 119.6, 119.3, 118.7 (q, J=321.1 Hz), 117.6, 115.7, 81.0, 80.9, 28.3, 28.2

$^{19}$F-NMR (470 MHz, CDCl$_3$): δ=−72.6 (s, 3F)

IR (neat); 1699, 1622, 1499, 1423, 1211, 1138, 883 cm$^{-1}$

HRMS (ESI$^+$): Calcd. for [C$_{30}$H$_{30}$F$_3$N$_3$O$_7$S+H]$^+$: m/z=634.1829, Found: 634.1837.

(Process 8: Synthesis of Compound 8)

Compound 7 (213 mg) was dissolved in tetrahydrofuran (3.5 mL), and iodomethane (3.5 mL) was added dropwise. The mixture was stirred at 120° C. for 3 days, then cooled to room temperature, and concentrated under a reduced pressure. The remaining residue was washed with ethyl acetate to obtain Compound 8 as an ocher solid. Compound 8 was used in the next process without additional purification.

(Process 9: Synthesis of Compound 9)

Compound 8 was dissolved in methanol (7.5 mL), and sodium borohydride (27 mg) was added dropwise. The mixture was stirred at room temperature for 30 minutes, and the solvent was then concentrated under a reduced pressure using an evaporator. The obtained residue was purified through silica gel flash column chromatography (dichloromethane:ether=20:1) to obtain Compound 9 (143 mg) as an ocher solid. The measurement results of NMR, IR, and MS of Compound 9 are as shown below.

$^1$H-NMR (500 MHz, CDCl$_3$): δ=7.65-7.61 (m, 3H), 7.57 (d, J=9.2 Hz, 1H), 7.19-7.12 (m, 4H), 6.72 (m, 2H), 6.48 (brs, 1H), 6.45 (brs, 1H), 5.30 (s, 1H), 2.84 (s, 3H), 1.48 (s, 9H), 1.28 (s, 9H)

$^{13}$C-NMR (125 MHz, CDCl$_3$): δ=152.6, 148.8, 144.4, 141.5, 139.4, 137.2, 134.6, 131.7, 128.5, 125.4, 123.2, 122.9, 121.3, 118.6 (q, J=321.1 Hz), 118.2, 116.7, 116.2, 107.9, 102.4, 80.7, 80.5, 67.0, 37.3, 28.3, 28.3

$^{19}$F-NMR (470 MHz, CDCl$_3$): δ=−72.8 (s, 3F)

IR (neat): 2158, 2027, 1977, 1697, 1610, 1510, 1138 cm$^{-1}$

HRMS (ESI+): Calcd. for [C$_{31}$H$_{34}$F$_3$N$_3$O$_7$S+H]$^+$: m/z=650.2142, Found: 650.2156.

(Process 10: Synthesis of Compound 10)

Compound 9 (420 mg), [1,1'-bis(diphenylphosphino)ferrocene]palladium (II) dichloride dichloromethane adduct (PdCl$_2$(dppf)·CH$_2$Cl$_2$, 108 mg), potassium acetate (195 mg), and bispinacolborane (PinB-BPin, 185 mg) were weighed out in a flask, and dimethyl sulfoxide (DMSO, 7 mL) was added thereto. After freeze degassing (three times) was performed, the mixture was stirred at 85° C. for 12 hours. After the temperature was cooled to room temperature, ethyl acetate was added. The obtained suspension was passed through a short layer of silica gel, and the silica gel was washed with ethyl acetate. The collected organic solvent was washed with water and a saturated saline solution, and sodium sulfate was added to the organic layer. The drying agent was removed through filtration, and the filtrate was concentrated under a reduced pressure. The obtained residue was purified through silica gel flash column chromatography (hexane:ethyl acetate=3:1) to obtain Compound 10 (compound represented by Formula (B22), 381 mg) as an ocher solid. The measurement results of NMIR, IR, and MS of Compound 10 are as shown below.

$^1$H-NMR (500 MHz, CDCl$_3$): δ=7.65-7.61 (m, 3H), 7.57 (d, J=8.6 Hz, 1H), 7.19-7.12 (m, 4H), 6.72-6.71 (m, 2H), 6.47 (brs, 1H), 6.44 (brs, 1H), 5.30 (s, 1H), 2.84 (s, 3H), 1.50 (s, 9H), 1.48 (s, 9H)

$^{13}$C-NMR (125 MHz, CDCl$_3$): δ=152.5, 152.5, 144.9, 144.1, 139.1, 137.0, 135.3, 135.0, 126.2, 125.6, 123.1, 122.7, 117.9, 116.9, 116.5, 107.5, 102.2, 83.6, 80.4, 80.3, 67.9, 37.2, 28.3, 28.3, 24.8

IR (CHCl$_3$): 1724, 1611, 1506, 1360, 1155 cm$^{-1}$

HRMS (ESI): Calcd. for [C$_{36}$H$_{46}$BN$_3$O$_6$+H]+: m/z=628.3551, Found: 628.3579.

[Synthesis of Precursor of [$^{18}$F]FHM]

(Process 11: Synthesis of Compound 11)

Compound 6 (500 mg) and potassium carbonate (160 mg) were weighed out in a flask, purging with argon was performed, and dehydrated acetone (10 mL) was then added thereto. Benzyl bromide (205 mg) was added dropwise at room temperature, and the mixture was stirred at 80° C. for 6 hours. Then, the solvent was concentrated under a reduced pressure using an evaporator, and the obtained solid was dissolved in ethyl acetate. The solution was washed with water and a saturated saline solution, and the organic layer was dried with sodium sulfate. The drying agent was removed through filtration, the solvent was then concentrated under a reduced pressure, and purification was performed through silica gel flash column chromatography (hexane:ethyl acetate=3:1) to obtain Compound 11 (660 mg) as an ocher solid. The measurement results of NMR, IR, and MS of Compound 11 are as shown below.

$^1$H-NMR (500 MHz, CDCl$_3$): δ=8.50 (d, J=8.6 Hz, 1H), 8.41 (d, J=8.6 Hz, 1H), 8.10 (brs, 1H), 7.95 (brs, 1H), 7.90 (d, J=2.3 Hz, 1H), 7.80 (d, J=2.3 Hz, 1H), 7.65 (d, J=8.6 Hz, 2H), 7.48 (d, J=7.5 Hz, 2H), 7.41 (dd, J=7.5, 7.5 Hz, 2H), 7.35 (t, J=7.5 Hz, 1H), 7.12 (d, J=8.6 Hz, 2H), 6.79 (brs, 2H), 5.15 (s, 2H), 1.56 (s, 9H), 1.51 (s, 9H)

$^{13}$C-NMR (125 MHz, CDCl$_3$): δ=160.7, 159.3, 152.7, 143.8, 138.5, 136.9, 136.8, 132.4, 131.0, 129.3, 128.6, 128.0, 127.4, 127.0, 125.2, 122.9, 122.8, 122.4, 119.3, 118.8, 117.5, 116.5, 114.8, 80.9, 80.8, 70.0, 28.3, 28.3

IR (neat): 2158, 2029, 1977, 1687, 1604, 1323, 1166, 1083 cm$^{-1}$

HRMS (ESI+): Calcd. for [C$_{36}$H$_{37}$N$_3$O$_5$+H]+: m/z=592.2806, Found: 592.2803.

(Process 12: Synthesis of Compound 12)

Under an argon atmosphere, Compound 11 (660 mg) was dissolved in tetrahydrofuran (THF, 6.0 mL), iodomethane (11 mL) was added thereto, and the mixture was heated and refluxed at 120° C. for 24 hours. After the reaction, the mixture was concentrated under a reduced pressure, the obtained component was dissolved in methanol (10 mL), and sodium borohydride (85 mg) was added thereto. The mixture was stirred at room temperature for 30 minutes. The reaction solution was concentrated under a reduced pressure, and the residue was purified through silica gel flash column chromatography (dichloromethane:ether=20:1) to obtain Compound 12 (541 mg) as an ocher solid. The measurement results of NMR, JR, and MS of Compound 12 are as shown below.

$^1$H-NMR (500 MHz, CDCl$_3$): δ=7.66 (d, J=9.2 Hz, 1H), 7.58 (d, J=8.6 Hz, 1H), 7.38-7.28 (m, 5H), 7.18-7.02 (m, 2H), 7.03 (d, J=8.6 Hz, 2H), 6.77-6.70 (m, 4H), 6.43 (brs, 1H), 6.40 (brs, 1H), 5.25 (s, 1H), 4.95 (s, 2H), 2.87 (s, 3H), 1.50 (s, 9H), 1.49 (s, 9H)

$^{13}$C-NMR (125 MHz, CDCl$_3$): δ=158.2, 152.6, 152.5, 144.9, 139.1, 137.0, 136.9, 135.8, 133.8, 128.5, 128.0, 127.9, 127.4, 125.5, 123.0, 122.6, 117.8, 117.0, 116.3, 114.6, 107.4, 102.3, 80.4, 80.3, 69.8, 67.2, 37.0, 28.3, 28.3

IR (neat): 1259, 2031, 1977, 1699, 1607, 1506, 1229, 1148 cm$^{-1}$

HRMS (ESI+): Calcd. for [C$_{37}$H$_{41}$N$_3$O$_5$+H]+: m/z=608.3119, Found: 608.3117.

(Process 13: Synthesis of Compound 13)

Under an argon atmosphere, Compound 12 (280 mg) and potassium tert-butoxide (520 mg) were dissolved in THF (5.0 mL), 2-iodine propane (780 mg) was added thereto, and the mixture was heated and refluxed at 90° C. for 24 hours. Potassium tert-butoxide (260 mg) and 2-iodine propane (390 mg) were added thereto, and the mixture was additionally heated and refluxed for 24 hours. The mixture was cooled to room temperature and then concentrated under a reduced pressure, and the obtained solid was dissolved in ethyl acetate. The solution was washed with water, and the obtained organic layer was dried with sodium sulfate. The drying agent was removed through filtration, and the solvent was then concentrated under a reduced pressure. The obtained residue was purified through silica gel flash column chromatography (hexane:ethyl acetate=3:1) to obtain Compound 13 (150 mg) as a red solid. The measurement results of NMR, IR, and MS of Compound 13 are as shown below.

$^1$H-NMR (500 MHz, CDCl$_3$): δ=7.75 (d, J=8.6 Hz, 1H), 7.69 (d, J=8.0 Hz, 1H), 7.38-7.28 (m, 5H), 7.04-6.99 (m, 3H), 7.76-6.74 (m, 3H), 6.56 (dd, J=1.7, 8.0 Hz, 1H), 6.31 (d, J=1.7 Hz, 1H), 5.30 (s, 1H), 4.95 (s, 2H), 4.53-4.45 (m, 2H), 2.87 (s, 3H), 1.35 (s, 9H), 1.24 (s, 9H), 1.15-1.12 (m, 6H), 1.07-1.04 (m, 6H)

$^{13}$C-NMR (125 MHz, CDCl$_3$): δ=158.2, 154.8, 154.7, 144.9, 140.5, 138.2, 136.9, 136.0, 133.9, 128.8, 128.7, 128.5, 128.2, 127.9, 127.8, 127.3, 123.1, 122.5, 120.2, 119.2, 114.6, 114.3, 79.6, 79.4, 69.9, 67.0, 48.3, 37.1, 28.3, 28.2, 21.6, 21.6, 21.4, 21.3

IR (neat): 2159, 2031, 1977, 1697, 1506, 1483, 1233, 1150 cm$^{-1}$

HRMS (ESI+): Calcd. for [C$_{43}$H$_{53}$N$_3$O$_5$+H]+: m/z=692.4058, Found: 692.4055.

(Process 14: Synthesis of Compound 14)

Under an argon atmosphere, Compound 13 (150 mg) was dissolved in methanol (5.0 mL), and 10% palladium carbon (15 mg) was added thereto. The inside of the flask was replaced with hydrogen, and the mixture was stirred at room temperature for 24 hours. The reaction liquid was filtered through Celite, and the filtrate was concentrated under a reduced pressure. The obtained residue was purified through silica gel flash column chromatography (hexane:ethyl acetate=1:1) to obtain Compound 14 (140 mg) as a red solid. The measurement results of NMR, IR, and MS of Compound 14 are as shown below.

$^1$H-NMR (500 MHz, CDCl$_3$): δ=7.75 (d, J=8.0 Hz, 1H), 7.69 (d, J=8.0 Hz, 1H), 7.01-6.97 (m, 3H), 6.75 (d, J=1.7 Hz, 1H), 6.60 (d, J=8.6 Hz, 2H), 6.56 (dd, J=1.7, 8.0 Hz, 1H), 6.30 (d, J=1.7 Hz, 1H), 5.29 (s, 1H), 4.52-4.45 (m, 1H), 2.86 (s, 3H), 1.36 (s, 9H), 1.26 (s, 9H), 1.14-1.12 (m, 6H), 1.06-1.03 (m, 6H)

$^{13}$C-NMR (125 MHz, CDCl$_3$): δ=155.6, 155.0, 154.8, 144.9, 140.4, 138.2, 136.1, 133.2, 128.8, 128.7, 128.3, 127.9, 123.1, 122.5, 120.2, 119.1, 115.2, 114.3, 79.7, 79.6, 67.0, 48.4, 37.0, 28.4, 28.2, 21.6, 21.6, 21.4, 21.3

IR (neat): 2158, 2031, 1977, 1667, 105, 1489, 1321, 1163 cm$^{-1}$

HRMS (ESI+): Calcd. for [C$_{36}$H$_{47}$N$_3$O$_5$+H]+: m/z=602.3588, Found: 602.3565.

(Process 15: Synthesis of Compound 15)

Under an argon atmosphere, Compound 14 (150 mg) was dissolved in dichloromethane (5 mL), and N,N-diisopropylethylamine (130 mg) was added dropwise at 0° C. The mixture was stirred at room temperature for 30 minutes, and cooled to 0° C. again, and trifluoromethanesulfonic anhydride (Tf$_2$O, 141 mg) was added dropwise. The mixture was stirred at room temperature for 24 hours, and the reaction was then stopped with a saturated ammonium chloride aqueous solution. After extraction was performed using dichloromethane, washing with a saturated saline solution was performed, sodium sulfate was added to the collected organic layer, and drying was performed. The drying agent was removed through filtration, the filtrate was concentrated under a reduced pressure, and the remaining residue was purified through silica gel flash column chromatography (hexane:ethyl acetate=3:1) to obtain Compound 15 (135 mg) as a yellow solid. The measurement results of NMR, IR, and MS of Compound 15 are as shown below.

$^1$H-NMR (500 MHz, CDCl$_3$): δ=7.78 (d, J=8.6 Hz, 1H), 7.71 (d, J=8.0 Hz, 1H), 7.21 (d, J=8.6 Hz, 2H), 7.07-7.04 (m, 3H), 6.77 (d, J=1.7 Hz, 1H), 6.60 (dd, J=1.7, 8.0 Hz, 1H), 6.33 (d, J=1.7 Hz, 1H), 5.39 (s, 1H), 4.53-5.46 (m, 2H), 2.90 (s, 3H), 1.36 (s, 9H), 1.24 (s, 9H), 1.15-1.12 (m, 6H), 1.07-1.04 (m, 6H)

$^{13}$C-NMR (125 MHz, CDCl$_3$): δ=154.7, 154.6, 148.9, 144.2, 141.6, 140.8, 138.5, 134.7, 1294, 128.7, 128.3, 128.2, 123.3, 122.9, 121.3, 120.0, 119.7, 118.6 (q, J=319.9 Hz), 114.5, 79.7, 79.5, 66.7, 48.4, 37.3, 28.3, 28.2, 21.6, 21.6, 21.4, 21.3

$^{19}$F-NMR (470 MHz, CDCl$_3$): δ=−72.8 (s, 3F)

IR (neat): 2980, 1690, 1607, 1493, 1425, 1342, 1171, 1140, 1017 cm$^{-1}$

HRMS (ESI$^+$): Calcd. for [C$_{37}$H$_{46}$F$_3$N$_3$O$_7$S+H]$^+$: m/z=734.3081, Found: 734.3080.

(Process 16: Synthesis of Compound 16)

Compound 15 (135 mg), [1,1'-bis(diphenylphosphino)ferrocene]palladium (II) dichloride dichloromethane adduct (PdCl$_2$(dppf)·CH$_2$Cl$_2$, 30 mg), potassium acetate (55 mg), and bispinacolborane (PinB-BPin, 52 mg) were weighed out in a flask, and dimethyl sulfoxide (DMSO, 7 mL) was added thereto. After freeze degassing (three times) was performed, the mixture was stirred at 85° C. for 12 hours. After the temperature was cooled to room temperature, ethyl acetate was added. The obtained suspension was passed through a short layer of silica gel, and the silica gel was washed with ethyl acetate. The collected organic solvent was washed with water and a saturated saline solution, and sodium sulfate was added to the organic layer. The drying agent was removed through filtration, and the filtrate was concentrated under a reduced pressure. The obtained residue was purified through silica gel flash column chromatography (hexane:ethyl acetate=3:1) to obtain Compound 16 (compound represented by Formula (B1), 43 mg) as an ocher solid. The measurement results of NMR, IR, and MS of Compound 16 are as shown below.

$^1$H-NMR (500 MHz, CDCl$_3$): δ=7.73 (d, J=8.6 Hz, 1H), 7.67 (d, J=8.6 Hz, 1H), 7.60 (d, J=8.0 Hz, 2H), 7.13 (d, J=8.0 Hz, 2H), 7.00 (dd, J=1.7, 8.6 Hz, 1H), 6.79 (d, J=1.7 Hz, 1H), 6.56 (dd, J=1.7, 8.6 Hz, 1H), 6.32 (d, J=1.7 Hz, 1H), 5.37 (s, 1H), 4.54-4.44 (m, 2H), 2.88 (s, 3H), 1.36 (s, 9H), 1.29 (s, 12H), 1.26 (s, 9H), 1.15-1.13 (m, 6H), 1.05-1.02 (m, 6H)

$^{13}$C-NMR (125 MHz, CDCl$_3$): δ=154.8, 154.7, 144.9, 144.4, 140.5, 138.2, 135.4, 135.0, 129.0, 128.8, 128.2, 125.8, 123.2, 122.6, 120.0, 119.2, 114.1, 83.7, 79.6, 79.4, 67.6, 48.3, 37.3, 28.4, 28.2, 24.8, 21.6, 21.5, 21.3

IR (neat): 1684, 1607, 1491, 1392, 1362, 1344, 1168, 1090 cm$^{-1}$

HRMS (ESI$^+$): Calcd. for [C$_{42}$H$_{59}$BN$_3$O$_6$+H]$^+$: m/z=712.4491, Found: 712.4488.

Test Example 2: Synthesis of PET Probe

[Synthesis of [$^{18}$F]FHM]

[$^{18}$F]FHM was synthesized from a precursor compound (compound represented by Formula (B22)) according to the following scheme.

[Chem. 36]

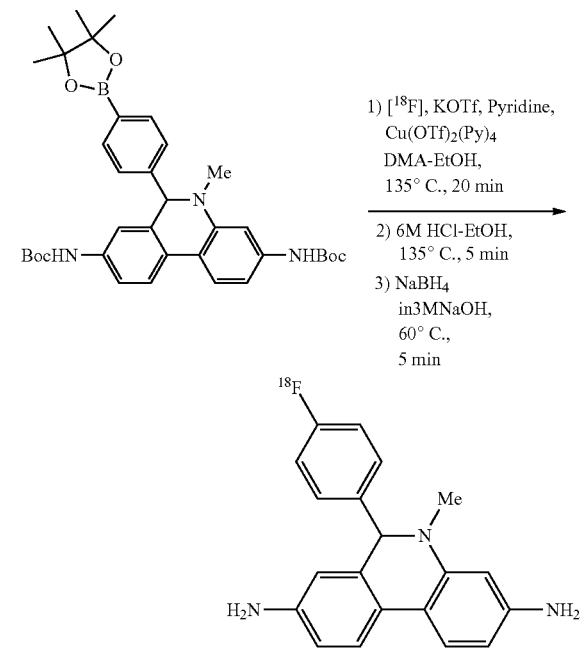

Protons accelerated to 18 MeV by a cyclotron (HM-18, commercially available from Sumitomo Heavy Industries) were emitted to a target containing about 2 mL of $^{18}$O—H$_2$O at a current value of 20 μA, and [$^{18}$F] was produced by $^{18}$O(p, n)$^{18}$F nuclear reaction. Within the target, [$^{18}$F] was provided in the chemical form of [$^{18}$F]F$^-$. After emission, target water containing the produced [$^{18}$F]F$^-$ was introduced into an automatic synthesis device.

Target water containing [$^{18}$F]F$^-$ was trapped in an ion exchange resin (AG1-X8, commercially available from Bio-Rad Laboratories, Inc.), and then eluted with 40 mM TfOK (0.5 mL) into a reaction container. Acetonitrile (2.0 mL) was added and the solvent was distilled off at 110° C. under a helium airflow. Acetonitrile (1.0 mL) was added to the residue, azeotropic dehydration was performed twice, and drying was additionally performed under a reduced pressure to obtain [$^{18}$F]KF used for fluorination.

After drying under a reduced pressure, a precursor compound (compound represented by Formula (B22)) (2.0 mg), Cu(OTf)$_2$(Py)$_4$ (15.0 mg), pyridine (40.0 μL), and DMA-EtOH (9/1, 0.5 mL) were added to [$^{18}$F]KF, and a fluorination reaction was caused at 135° C. for 20 minutes. Then, the temperature was cooled to room temperature, 6 M HCl- EtOH (1/1, 1.0 mL) was added, and a deprotection reaction was caused at 135° C. for 5 minutes. After the temperature was cooled to room temperature, a 3 M NaOH (1.0 mL) solution containing NaBH$_4$ (20.0 mg) was added, and a neutralization and reduction reaction was caused at 60° C. for 5 minutes. The reaction liquid was diluted with MeCN—H$_2$O (3/7, 1.0 mL), and purified through high performance liquid chromatography. CH$_3$CN/H$_2$O=450/550 was used as a mobile phase, Inertsil ODS-3 (10×250 mm) was used as a column, and fractionation was performed at a flow rate of 6 mL/min and a detection wavelength of 254 nm. A fraction of a labeled compound ([$^{18}$F]FHM) was fractionated, and the solvent was distilled off under heating and a reduced pressure. In addition, the residue was dissolved again in an injection saline and the labeled compound was then collected in a sterile vial. NaBH$_4$ was added to the collected solution at 5 mg/mL to prepare a final preparation.

The final preparation was analyzed through high performance liquid chromatography (column; L-Column2 (3 μm, 4.6×100 mm) mobile phase; A:B=55:45 (A=0.1% AcOH, 30 mM AcONH$_4$, B=CH$_3$CN), flow rate; 2 mL/min, and detection wavelength; 254 nm) (n=4). The results are as follows.
  Amount produced: 0.88±0.52 GBq (EOS)
  Average specific radioactivity: 24.3±8.9 GBq/gmol (EOS)
  Average synthesis time: 85.4±4.6 minutes
[Synthesis of [$^{18}$F]FPHM]
[$^{18}$F]FPHM was synthesized from a precursor compound (compound represented by Formula (B1)) according to the following scheme.

[Chem. 37]

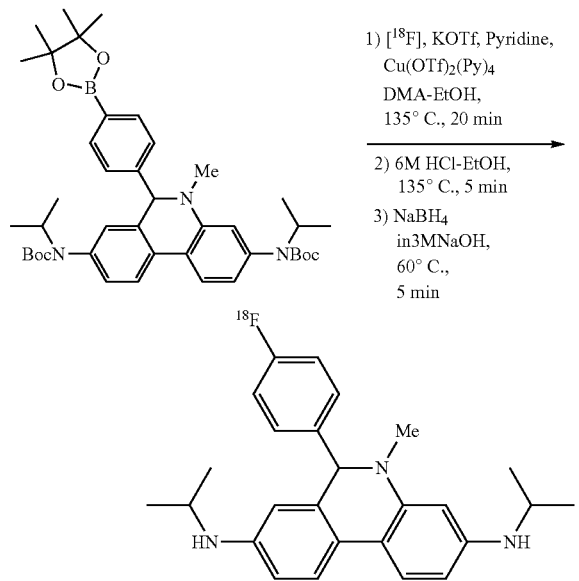

Protons accelerated to 18 MeV by a cyclotron (HM-18, commercially available from Sumitomo Heavy Industries) were emitted to a target containing about 2 mL of $^{18}$O—H$_2$O at a current value of 20 μA, and [$^{18}$F] was produced by $^{18}$O(p, n)$^{18}$F nuclear reaction. Within the target, [$^{18}$F] was provided in the chemical form of [$^{18}$F]F$^-$. After emission, target water containing the produced [$^{18}$F]F$^-$ was introduced into an automatic synthesis device.

Target water containing [$^{18}$F]F$^-$ was trapped in an ion exchange resin (AG1-X8, commercially available from Bio-Rad Laboratories, Inc.), and then eluted with 40 mM TfOK (0.5 mL) into a reaction container. Acetonitrile (2.0 mL) was added and the solvent was distilled off at 110° C. under a helium airflow. Acetonitrile (1.0 mL) was added to the residue, azeotropic dehydration was performed twice, and drying was additionally performed under a reduced pressure to obtain [$^{18}$F]KF used for fluorination.

After drying under a reduced pressure, a precursor compound (compound represented by Formula (B1)) (2.0 mg), Cu(OTf)$_2$(Py)$_4$ (15.0 mg), pyridine (40.0 μL), and DMA-EtOH (9/1, 0.5 mL) were added to [$^{18}$F]KF, and a fluorination reaction was caused at 135° C. for 20 minutes. Then, the temperature was cooled to room temperature, 6 M HCl-EtOH (1/1, 1.0 mL) was added, and a deprotection reaction was caused at 135° C. for 5 minutes. After the temperature was cooled to room temperature, a 3 M NaOH (1.0 mL) solution containing NaBH$_4$ (20.0 mg) was added, and a neutralization and reduction reaction was caused at 60° C. for 5 minutes. The reaction liquid was diluted with MeCN—H$_2$O (3/7, 1.0 mL), and purified through high performance liquid chromatography. CH$_3$OH/H$_2$O/HCOOH=450/550/1 was used as a mobile phase, YMC-Pac Pro C18 (5 μm, 10×250 mm) was used as a column, and fractionation was performed at a flow rate of 4.5 mL/min, and a detection wavelength of 254 nm. A fraction of a labeled compound ([$^{18}$F]FPHM) was fractionated, and the solvent was distilled off under heating and a reduced pressure. In addition, the residue was dissolved again in an injection saline and the labeled compound was then collected in a sterile vial. NaBH$_4$ was added to the collected solution at 5 mg/mL to prepare a final preparation.

The final preparation was analyzed through high performance liquid chromatography (column; L-Column2 (3 μm, 4.6×100 mm), mobile phase; A:B=55:45 (A=0.1% AcOH, 30 mM AcONH$_4$, B=CH$_3$CN), flow rate; 2 mL/min, detection wavelength; 254 nm) (n=4). The results are as follows.
  Amount produced: 0.19 GBq(EOS)
  Average synthesis time: 83.4±43.8 minutes
[Synthesis of [$^1$C]HM]

As a PET probe for comparison, a compound represented by Formula (C1) (hereinafter referred to as "[$^{11}$C]HM") was synthesized.

[Chem. 38]

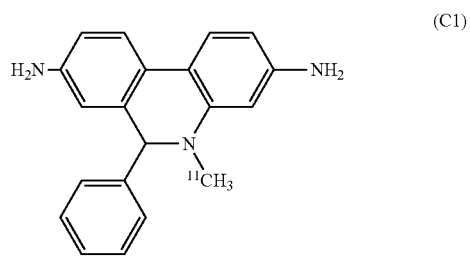

[¹¹C]HM was synthesized according to the following scheme.

[Chem. 39]

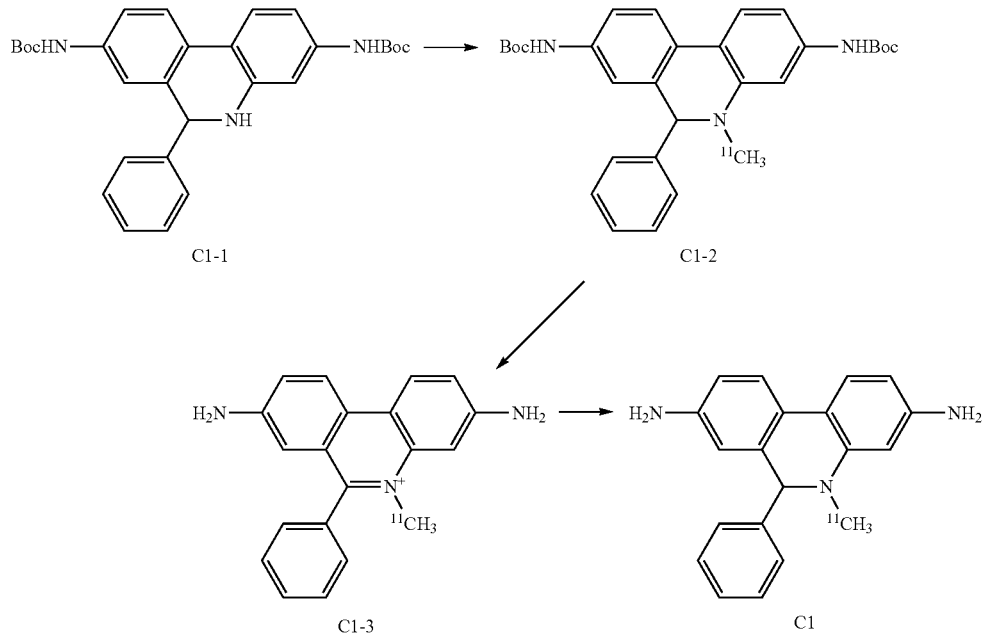

Protons accelerated to 18 MeV by a cyclotron (HM-18, commercially available from Sumitomo Heavy Industries) were emitted to a target containing pure nitrogen gas (G grade, commercially available from Japan Fine Products) at a current value of about 20 µA. [$^{11}$C]$CO_2$ produced by a $^{14}$N(p,α)$^{11}$C nuclear reaction was collected by an automatic synthesis device (commercially available from Sumitomo Heavy Industries), and introduced into 500 µL of the cooled 0.1 M LiAlH$_4$/tetrahydrofuran (THF) solution (ABX advanced biochemical compounds). After THF was distilled off, 0.5 mL of hydriodic acid (commercially available from Nacalai Tesque, Inc.) was added, and the produced [$^{11}$C] methyl iodide was distilled off, passed through a silver triflate column heated to 200° C., and converted to [$^{11}$C] methyl triflate.

1.5 mg of a precursor (Compound C1-1) was dissolved in 0.2 mL of methyl ethyl ketone, the above [$^{11}$C]methyl triflate was introduced, and methylation was performed at 50° C. for 3 minutes to synthesize Compound C1-2. Then, 6 N hydrochloric acid/ethanol=133 µL/320 µL was added, and a deprotection reaction was caused at 80° C. for 4 minutes to synthesize Compound C1-3. Then, sodium borohydride/1N sodium hydroxide=8 mg/820 µL was added to synthesize Compound C1.

The reaction liquid was fractionated through high performance liquid chromatography (column; YMC Pack Pro C18, 10*250 mm, 5 µm (YMC, USA), mobile phase; 20 mM phosphate buffer solution having a pH of 2.8 (0.5% ascorbic acid+0.05% NaHSO$_3$)/acetonitrile=500/500, flow rate; 6 mL/min, detection wavelength; 254 nm). The solvent was distilled off and a 0.1% Tween80/saline was added to the residue to prepare a final preparation.

The radioactivity of the final preparation was measured with a Curie-meter (IGC-7, commercially available from Hitachi Aloka Medical, Ltd.), and a part thereof was analyzed through high performance liquid chromatography for analysis (column; Finepak C18-S, 4.6*150 mm (commercially available from JASCO Corporation), mobile phase; acetonitrile (commercially available from Wako Pure Chemical Industries, Ltd.)/30 mM ammonium acetate (commercially available from Nacalai Tesque, Inc.)/acetic acid (commercially available from Wako Pure Chemical Industries, Ltd.)=500/500/2, flow rate; 2 mL/min, detection wavelength; 254 nm) (n=4). The results are as follows.

Amount produced: 2.54±1.18 GBq (EOS)
Average specific radioactivity: 50.4±16.9 GBq/µmol (EOS)
Average synthesis time: 30.1±3.8 minutes Test Example 3: Measurement of PET Accumulation of [$^{18}$F]FHM, [$^{18}$F]FPHM and [$^{11}$C]HM was analyzed using rats in which reactive oxygen species were produced in the brain (right striatum) to which sodium nitroprusside (SNP) has been administered.

While rats were anesthetized with 1.5-2.0% isoflurane (dilution gas:oxygen), 4 µL of a 20 nmol/µL SNP solution (saline) was injected into the right striatum of the rat at a rate of 0.8 µL/min using a Hamilton syringe (26 gauge). 4 µL of a saline was injected into the left striatum in the same method. PET measurement was performed on SNP-administered rats (SNP model rats) 60 minutes after SNP administration.

After transmission measurement was performed for 15 minutes for absorption correction, a bolus of 20 MBq [$^{18}$F]FHM, [$^{18}$F]FPHM or [$^{11}$C]HM was administered from the caudal vein of the rat, and emission measurement was performed for 90 minutes. After PET measurement was completed, the PET accumulation images of the brain 0-15 minutes, 15-30 minutes, 30-45 minutes, 45-60 minutes, 60-75 minutes, and 75-90 minutes after [$^{18}$F]FHM, [$^{18}$F] FPHM or [$^{11}$C]HM was administered were superimposed on the brain CT images. Regions of interest were set on the PET images of the right striatum and the left striatum identified from the X-CT images, and the value normalized according to the body weight of each individual subject and the administered radioactivity amount was used as the amount of [$^{18}$F]FHM, [$^8$F]FPHM or [nC]HM accumulated at each site (radioactivity accumulated amount (SUV)) (each group, 5 rats).

In addition, as a control, PET measurement was performed on rats in which only a saline was administered to both the right striatum and the left striatum (control rat) in the same method as above.

Figure 2:
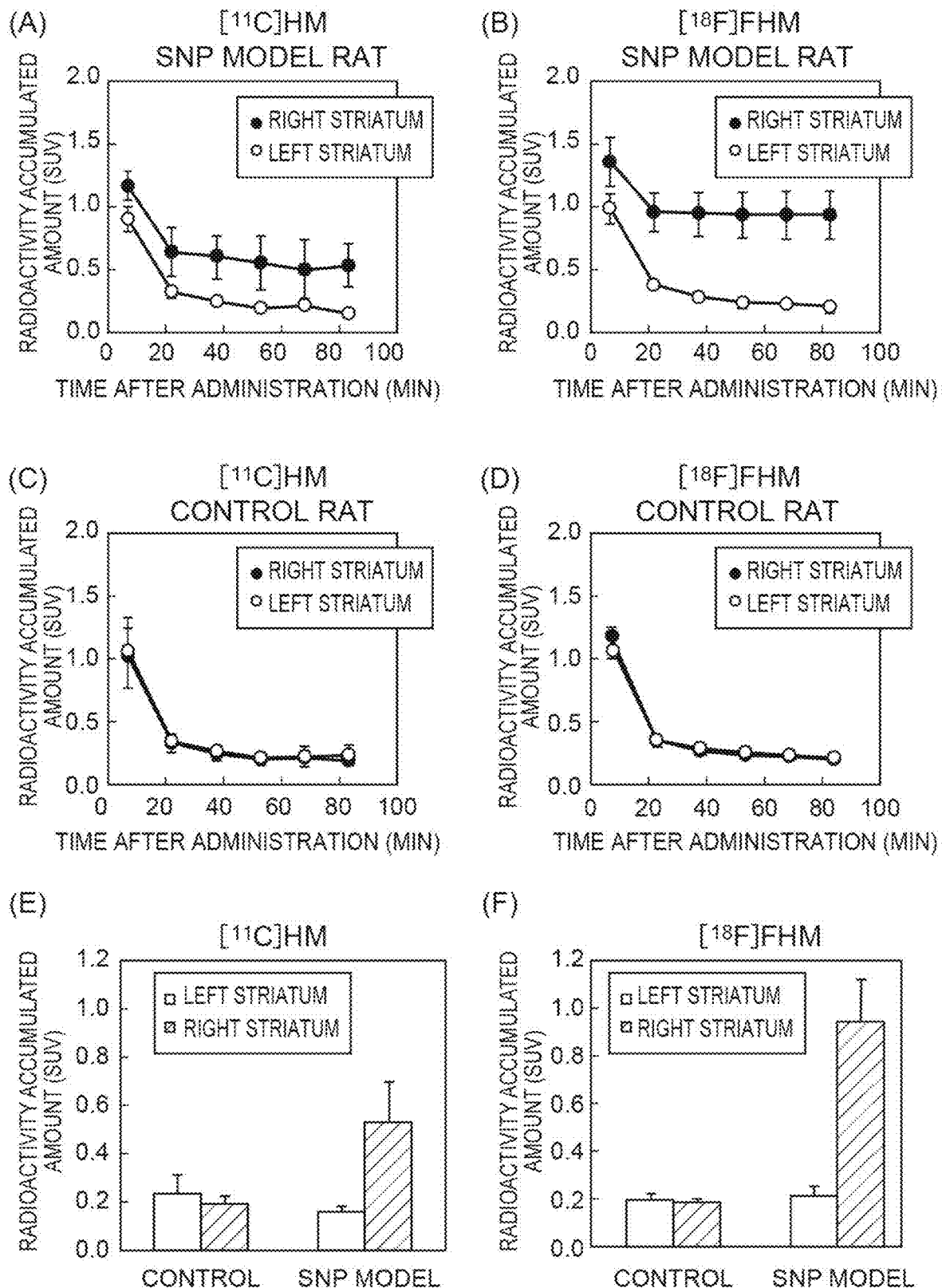
FIG. 2 shows graphs of the results obtained by measuring the amounts (radioactivity accumulated amount (SUV)) of [$^{18}$F]FHM or [$^{11}$C]HM accumulated in the right striatum and the left striatum of rats (SNP model rats and control rats) to which [$^{18}$F]FHM or [$^{11}$C]HM has been administered.
Figure 3:
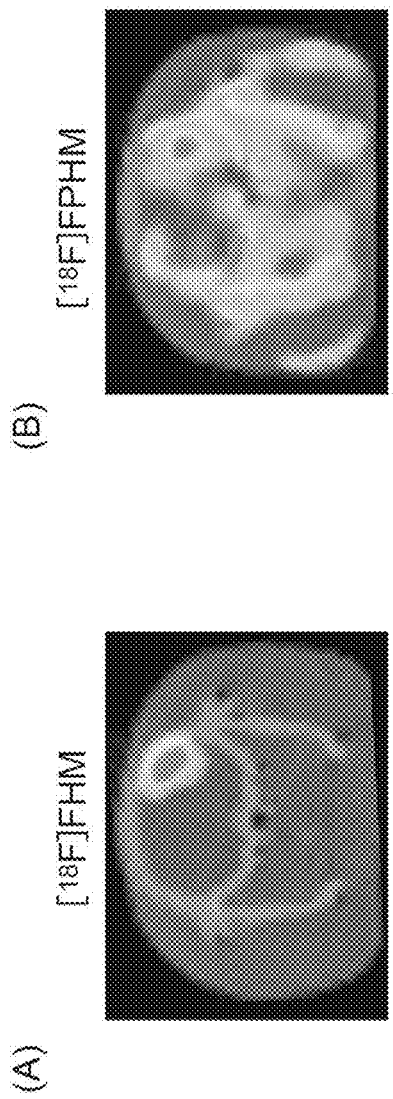
FIG. 3 shows images in which PET accumulation images are superimposed on brain CT images of SNP model rats to which [$^{18}$F]FHM or [$^{18}$F]FPHANM has been administered (FIGS. 3(A) and 3(B)), and graphs showing the results obtained by measuring the amounts (radioactivity accumulated amount (SUV)) of [$^{18}$F]FHM or [$^{11}$C]HM accumulated in the right striatum and the left striatum (FIGS. 3(C) to 3(E)).
Figure 3:
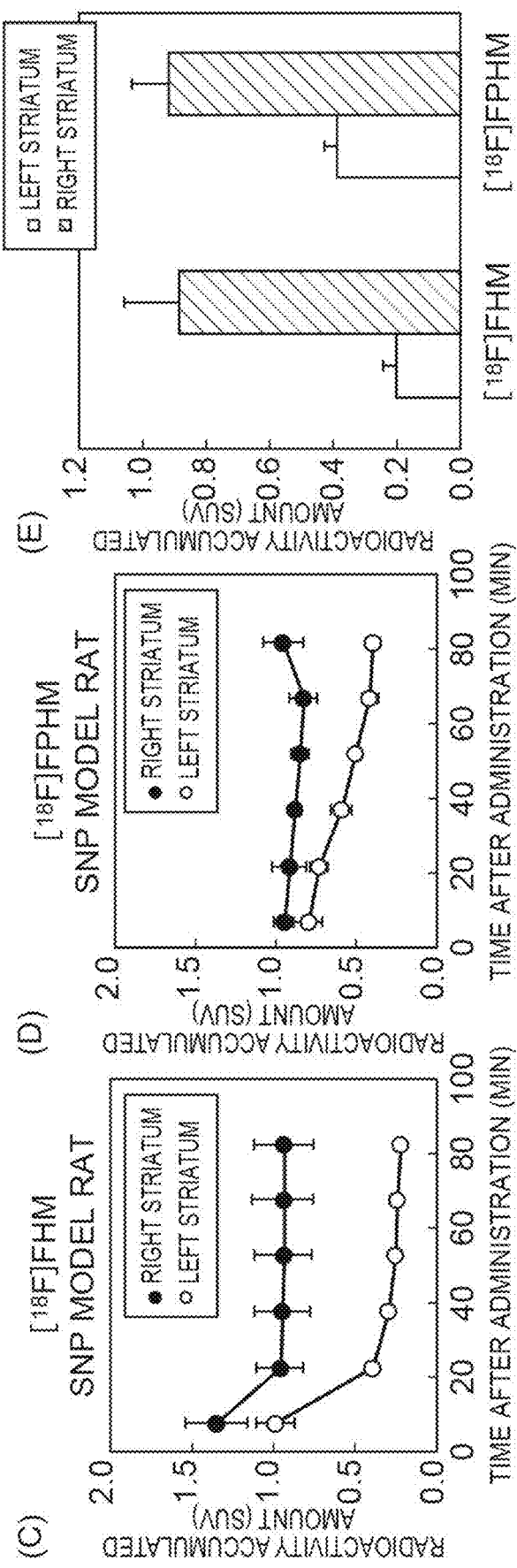

FIG. 1 to FIG. 3 shows the results of PET measurement. FIG. 1 shows images in which PET accumulation images are superimposed on brain CT images of SNP model rats to which [$^{18}$F]FHM or [$^{11}$C]HM has been administered. FIG. 1(A) is an image of the SNP model rat to which [$^{18}$F]FHM was administered. From left to right, the images show the state 0-15 minutes, 15-30 minutes, 30-45 minutes, 45-60 minutes, 60-75 minutes and 75-90 minutes after [$^{18}$F]FHM was administered. FIG. 1(B) is an image of the SNP model rat to which [$^{11}$C]HM was administered. From left to right, the images show the state 0-15 minutes, 15-30 minutes, 30-45 minutes, 45-60 minutes, 60-75 minutes and 75-90 minutes after [$^{11}$C]HM was administered. As shown in FIG. 1, all probes showed a large amount of accumulation in the right striatum to which SNP has been administered.

FIG. 2 shows graphs of the results obtained by measuring the amount (radioactivity accumulated amount (SUV)) of [$^{18}$F]FHM or [$^{11}$C]HM accumulated in the right striatum and the left striatum of rats to which [$^{18}$F]FHM or [$^{11}$C]HM has been administered. FIGS. 2(A) and 2(B) are graphs showing the results in the SNP model rats. FIGS. 2(C) and 2(D) are graphs showing the results in the control rats. In addition, FIGS. 2(A) and 2(C) are graphs showing the results when [$^{11}$C]HM was administered. FIGS. 2(B) and 2(D) are graphs showing the results when [$^{18}$F]FHM was administered. FIG. 2(E) is a graph showing the accumulated amount 30-45 minutes after administration in FIGS. 2(A) and 2(C). FIG. 2(F) is a graph showing the accumulated amount 30-45 minutes after administration in FIGS. 2(B) and 2(D).

From the results in the control rats (FIGS. 2(C) and 2(D)), it can be understood that the radioactivity of all probes disappeared more quickly than the striatum. From the results in the SNP model rats (FIGS. 2(A) and 2(B)), it can be understood that the radioactivity accumulated amount increased in the right striatum to which SNP has been administered. In addition, the radioactivity accumulated amount in the right striatum was larger in [$^{18}$F]FHM than in [$^{11}$C]HM. In FIGS. 2(E) and 2(F), the radioactivity accumulated amount in the left striatum as a control was, for [$^{11}$C]HM, about 3 times and for [$^{18}$F]FHM, about 5 times the radioactivity accumulated amount of the right striatum to which SNP has been administered. That is, when [$^{18}$F]FHM was used as a PET probe, the production of reactive oxygen species (ROS) can be determined with higher sensitivity compared to when conventional [$^{11}$C]HM was used as a PET probe.

FIG. 3 shows the results in the SNP model rats to which [$^{18}$F]FHM or [$^{18}$F]FPHM has been administered. FIGS. 3(A) and 3(B) are images in which PET accumulation images are superimposed on brain CT images of SNP model rats to which [$^{18}$F]FHM or [$^{18}$F]FPHM has been administered (75-90 minutes after administration). FIGS. 3(C) and 3(D) are graphs showing the results obtained by measuring the amount (radioactivity accumulated amount (SUV)) of [$^{18}$F]FHM or [$^{11}$C]HM accumulated in the right striatum and the left striatum of the SNP model rats to which [$^{18}$F]FHM or [$^{18}$F]FPHM has been administered. FIG. 3(E) is the graph showing the accumulated amount 30-45 minutes after administration in FIGS. 3(C) and 3(D).

In FIG. 3, it can be understood that, even if [$^{18}$F]FPHM was used as a PET probe, a sufficient accumulation ratio was exhibited.

Test Example 4: Analysis of DNA Intercalation

In the compound represented by the following Formula (E4), the relationship between the types of substituents for $R^{11}$, $R^{12}$, $R^{13}$ and $R^{14}$ and intercalation into DNA was analyzed.

[Chem. 40]

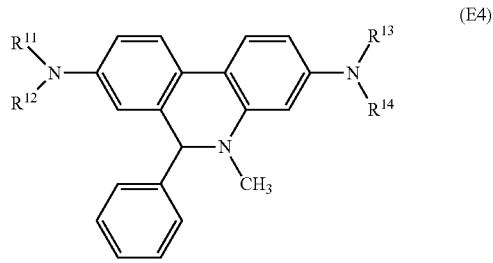

(E4)

Figure 4:
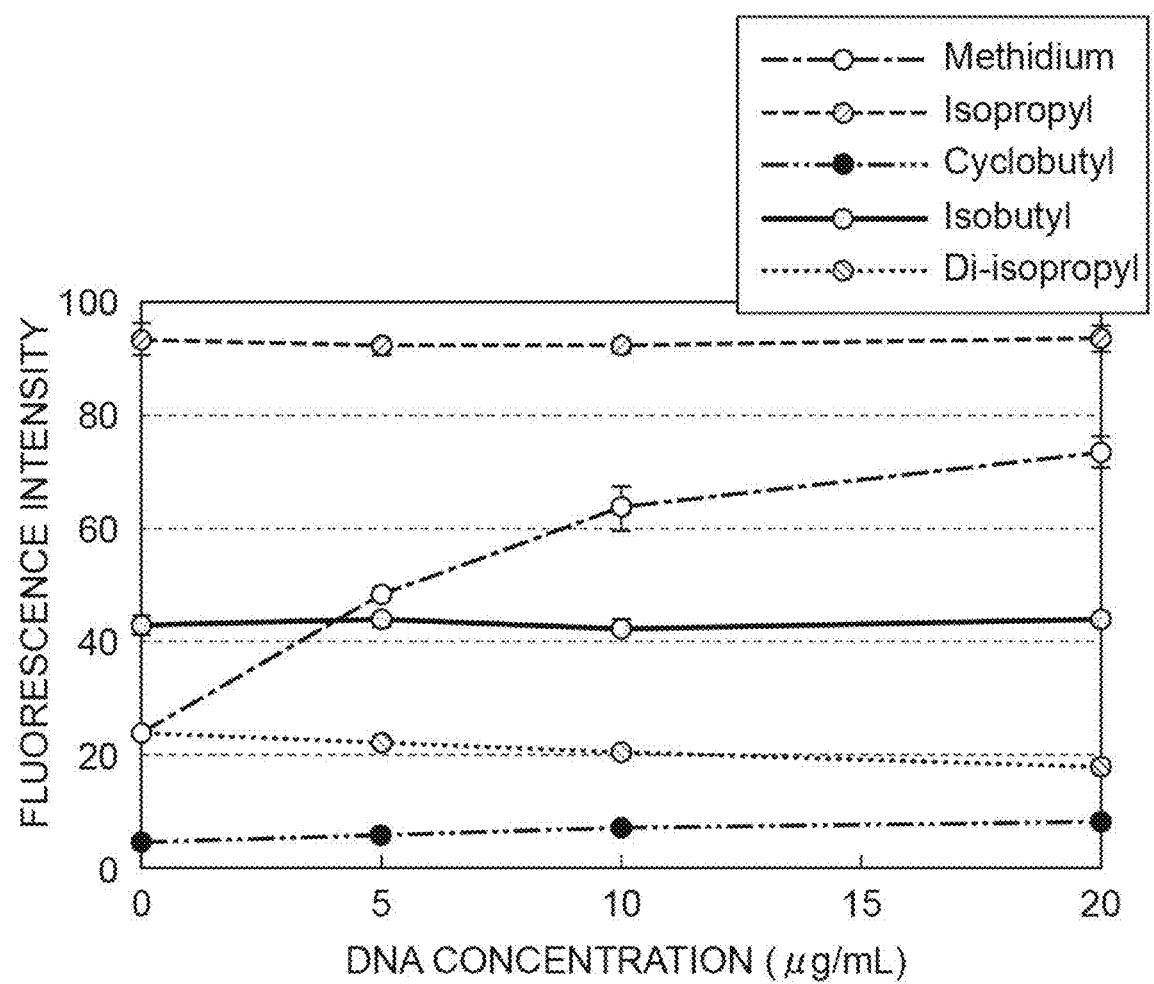
FIG. 4 is a graph showing the results obtained by measuring the fluorescence intensity due to mixing various compounds and DNA at various concentrations in Test Example 4.

Since the fluorescence intensity was improved due to intercalation of the compound between base pairs of DNA, the fluorescence intensity was measured by mixing DNA and the compound. First, the compounds shown in Table 1 were dissolved in a 0.1 M Tris-HCl buffer solution (pH 7.5) at 10 μg/mL, and bovine thymus DNA was added thereto at 0 μg/mL, 5 μg/mL, 10 μg/mL or 20 μg/mL to prepare measurement samples. Then, the fluorescence intensity of each measurement sample was measured (excitation wavelength 355 to 536 nm, fluorescence wavelength of 420 to 605 nm). The results are shown in FIG. 4 and Table 1. In Table 1, the fluorescence intensity ratio is a ratio (DNA20/DNA0) of the fluorescence intensity (DNA20) when the DNA concentration was 20 μg/mL and the fluorescence intensity (DNA0) when the DNA concentration was 0 μg/mL.

TABLE 1

|  | $R^{11}$ | $R^{12}$ | $R^{13}$ | $R^{14}$ | φ | ε · φ | Fluorescence intensity ratio |
|---|---|---|---|---|---|---|---|
| Methidium | H | H | H | H | 2.68 | 97.34 | 3.03 |
| Isopropyl form | H | H$_3$C—CH—CH$_3$ | H | H$_3$C—CH—CH$_3$ | 40.6 | 568.8 | 0.996 |

TABLE 1-continued

| | $R^{11}$ | $R^{12}$ | $R^{13}$ | $R^{14}$ | φ | ε · φ | Fluorescence intensity ratio |
|---|---|---|---|---|---|---|---|
| Cyclobutyl form | H | cyclobutyl | H | cyclobutyl | 3.62 | 47.04 | 1.62 |
| Isobutyl form | H | $H_3C-C(CH_3)_2-$ | H | $H_3C-C(CH_3)_2-$ | 10.2 | 143.0 | 1.01 |
| Di-isopropyl form | $H_3C-CH(CH_3)-$ | $H_3C-CH(CH_3)-$ | $H_3C-CH(CH_3)-$ | $H_3C-CH(CH_3)-$ | 8.48 | 118.8 | 0.759 |

φ: quantum yield ($10^{-3}$), ε: molar absorption coefficient

In addition, since the absorption spectrum shifted to the long wavelength side due to intercalation of the compound between base pairs of DNA (bathochromic effect), the shift of the absorption wavelength was measured by mixing DNA and the compound. Specifically, the compounds shown in Table 2 were dissolved in a 0.1 M Tris-HCl buffer solution at 10 μg/mL, and bovine thymus DNA was added thereto at 0 μg/mL or 30 μg/mL to prepare measurement samples. Then, the absorption spectrum of each measurement sample was measured, and the absorption wavelength (peak top wavelength) was determined. The results are shown in Table 2.

TABLE 2

| | $R^{11}$ | $R^{12}$ | $R^{13}$ | $R^{14}$ | DNA0 | DNA30 | Absorption wavelength difference |
|---|---|---|---|---|---|---|---|
| Methidium | Same as Table 1 | Same as Table 1 | Same as Table 1 | Same as Table 1 | 481 nm | 521 nm | 40 nm |
| Isopropyl form | Same as Table 1 | Same as Table 1 | Same as Table 1 | Same as Table 1 | 517 nm | 525 nm | 8 nm |
| Cyclobutyl form | Same as Table 1 | Same as Table 1 | Same as Table 1 | Same as Table 1 | 557 nm | 575 nm | 18 nm |
| Isobutyl form | Same as Table 1 | Same as Table 1 | Same as Table 1 | Same as Table 1 | 531 nm | 537 nm | 6 nm |
| Di-isopropyl form | Same as Table 1 | Same as Table 1 | Same as Table 1 | Same as Table 1 | 559 nm | 563 nm | 4 nm |

DNA0: Absorption wavelength when DNA concentration was 0 μg/mL
DNA30: Absorption wavelength when DNA concentration was 30 μg/mL As shown in FIG. 4 and Table 1, it can be understood that, in Methidium in which $R^{11}$, $R^{12}$, $R^{13}$ and $R^{14}$ were all hydrogen atoms, the fluorescence intensity was improved in proportion to the DNA concentration, and intercalation into DNA occurred. On the other hand, it can be understood that, in other derivatives (Isopropyl form, Cyclobutyl form, Isobutyl form, Di-isopropyl form), an increase in fluorescence intensity was not observed, and almost no intercalation into DNA occurred. Similarly, as shown in Table 2, it can be understood that, in Methidium, the absorption wavelength was largely shifted, and intercalation into DNA occurred. On the other hand, it can be understood that, in other derivatives (Isopropyl form, Cyclobutyl form, Isobutyl form, Di-isopropyl form), a change in absorption wavelength was small, and almost no intercalation into DNA occurred. Based on these results, it is thought that $R^1$, $R^{12}$, $R^{13}$ or $R^{14}$ having a bulky substituent makes it difficult to enter the double helix of DNA and makes it difficult to cause intercalation into DNA.

Test Example 5: Fluorescence Measurement

A compound represented by the following Formula (A23) (hereinafter referred to as an "isopropyl reduced component") was synthesized from a precursor compound (compound represented by Formula (B1)).

[Chem. 41]

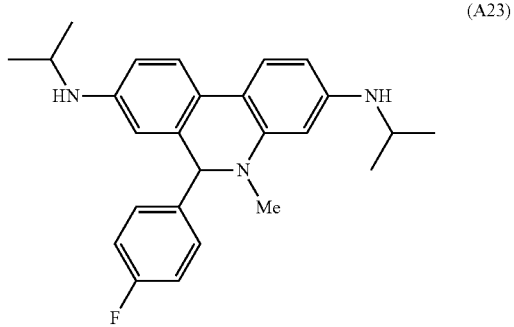

(A23)

The isopropyl reduced component was synthesized according to the following scheme.
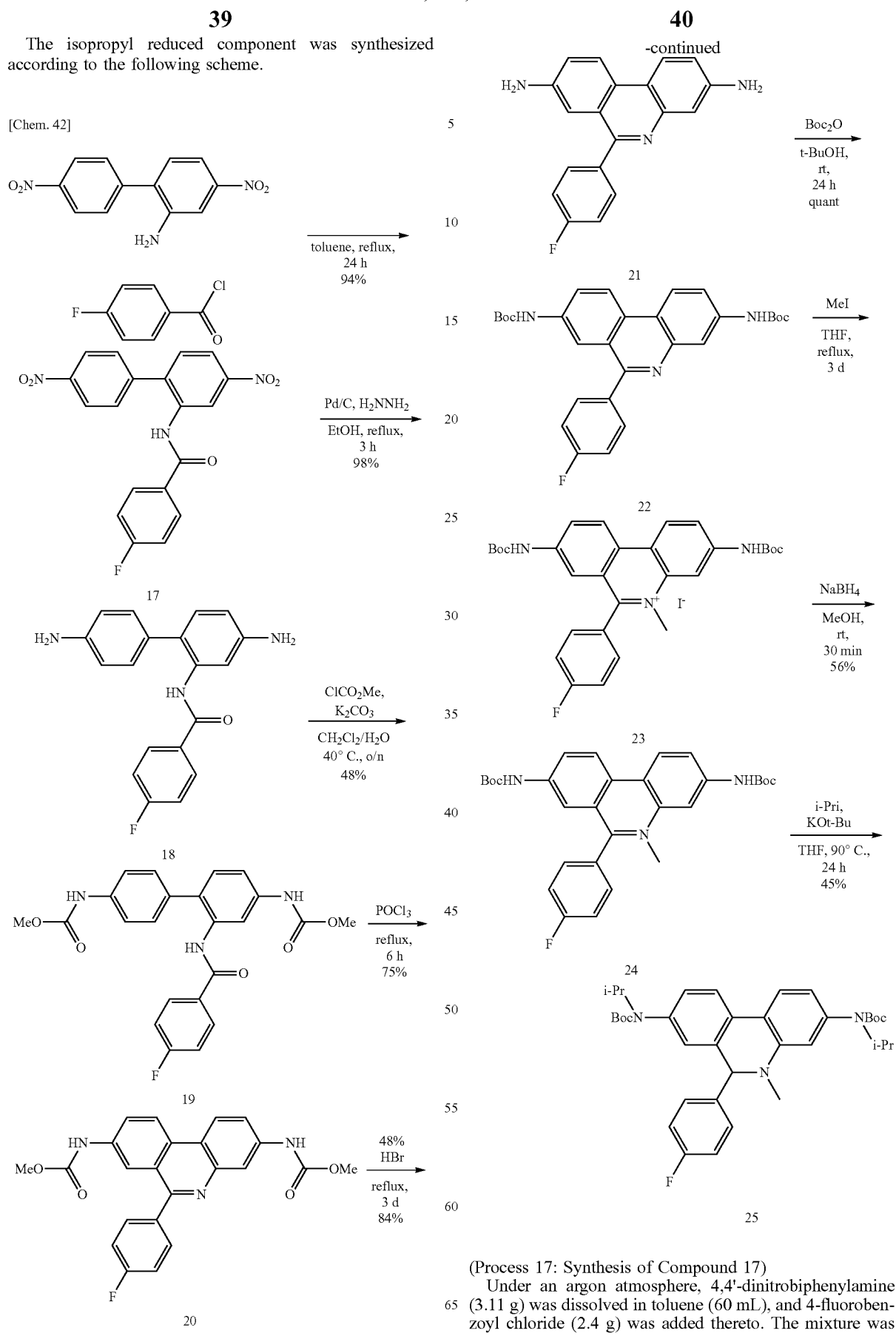
(Process 17: Synthesis of Compound 17)
Under an argon atmosphere, 4,4'-dinitrobiphenylamine (3.11 g) was dissolved in toluene (60 mL), and 4-fluorobenzoyl chloride (2.4 g) was added thereto. The mixture was refluxed and stirred at 125° C. for 24 hours. The obtained solid was collected, and washed with ether and warm methanol (50° C.). The obtained solid was sufficiently dried in a vacuum to obtain Compound 17 (4.3 g) as an ocher solid.

(Process 18: Synthesis of Compound 18)

Compound 17 (4.29 g) was dissolved in ethanol (50 mL), and 10% palladium carbon (191 mg) was added thereto. This solution was cooled to 0° C., and a hydrazine aqueous solution (5.6 g) was added dropwise. Then, the mixture was heated and refluxed at 90° C. for 3 hours. The reaction liquid was cooled to room temperature, filtered through Celite, and concentrated under a reduced pressure. The obtained solid was dissolved in ethyl acetate and washed with a saturated sodium bicarbonate aqueous solution, water, and a saturated saline solution using a separatory funnel. Sodium sulfate was added to the obtained organic layer, drying was performed, and a drying agent was then removed through filtration. The solvent of the filtrate was removed under a reduced pressure, and purification was performed through silica gel flash column chromatography (hexane:ethyl acetate=1:1) to obtain Compound 18 (3.55 g) as a yellow solid.

(Process 19: Synthesis of Compound 19)

Potassium carbonate (4.7 g), dichloromethane (80 mL), water (80 mL), and methyl formate chloride (4.16 g) were added to Compound 18 (3.55 g), and the mixture was stirred at room temperature for 24 hours. The organic layer was washed with water and a saturated saline solution, sodium sulfate was added, and the mixture was dried. The drying agent was removed through filtration, the solvent was then distilled off under a reduced pressure, and purification was performed through silica gel flash column chromatography (hexane:ethyl acetate=1:1) to obtain Compound 19 (2.3 g) as a white solid.

(Process 20: Synthesis of Compound 20)

Compound 19 (1.3 g) and phosphoryl chloride (15 mL) were mixed, and the mixture was heated, refluxed and stirred at 120° C. for 6 hours. Then, while the reaction solution was cooled, it was neutralized using sodium hydroxide and sodium carbonate so that the pH was 8.0, and organic substances were extracted with ethyl acetate. The extraction liquid was washed with water and a saturated saline solution, sodium sulfate was then added to the obtained organic layer, and the mixture was dried. The drying agent was removed through filtration, the solvent was then removed under a reduced pressure, and purification was performed through silica gel flash column chromatography (hexane:ethyl acetate=2:1) to obtain Compound 20 (940 mg) as a yellow solid.

(Process 21: Synthesis of Compound 21)

Compound 20 (890 mg) and 48% hydrobromic acid (20 mL) were mixed, and the mixture was heated and refluxed at 140° C. for 24 hours. Then, while the reaction solution was cooled, it was neutralized using sodium hydroxide and sodium carbonate so that the pH was 8.0, and organic substances were extracted with ethyl acetate. The extraction liquid was washed with water and a saturated saline solution, sodium sulfate was then added to the obtained organic layer, and the mixture was dried. The drying agent was removed through filtration, the solvent was then removed under a reduced pressure, and purification was performed through silica gel flash column chromatography (ethyl acetate) to obtain Compound 21 (540 mg) as a brown solid.

(Process 22: Synthesis of Compound 22)

Compound 21 (310 mg) and di-tert-butyl dicarbonate (Boc$_2$O, 540 mg) were dissolved in tert-butyl alcohol (25 mL) and stirred at 40° C. for 24 hours. After returning to room temperature, the sample was concentrated under a reduced pressure, and purification was performed through silica gel flash column chromatography (hexane:ethyl acetate=1:1) to obtain Compound 22 (566 mg) as a white solid.

(Process 23: Synthesis of Compound 23)

Compound 22 (443 mg) was dissolved in tetrahydrofuran (6 mL), and iodomethane (6 mL) was added dropwise. The mixture was stirred at 120° C. for 3 days, then cooled to room temperature, and concentrated under a reduced pressure. The remaining residue was washed with ethyl acetate to obtain Compound 23 as an ocher solid. Compound 23 was used in the next process without additional purification.

(Process 24: Synthesis of Compound 24)

Compound 23 was dissolved in methanol (2.0 mL), and sodium borohydride (46 mg) was added dropwise. The mixture was stirred at room temperature for 30 minutes, and the solvent was then concentrated under a reduced pressure using an evaporator. The obtained residue was purified through silica gel flash column chromatography (dichloromethane:ether=20:1) to obtain Compound 24 (165 mg) as an ocher solid.

(Process 25: Synthesis of Compound 25)

Under an argon atmosphere, Compound 24 (150 mg) and potassium tert-butoxide (325 mg) were dissolved in THF (5.0 mL), 2-iodine propane (490 mg) was added thereto, and the mixture was heated and refluxed at 90° C. for 24 hours. Potassium tert-butoxide (160 mg) and 2-iodine propane (250 mg) were added, and the mixture was additionally heated and refluxed for 24 hours. The mixture was cooled to room temperature and then concentrated under a reduced pressure, and the obtained solid was dissolved in ethyl acetate. The solution was washed with water and a saturated saline solution, and the obtained organic layer was dried with sodium sulfate. The drying agent was removed through filtration, and the solvent was then concentrated under a reduced pressure. The obtained residue was purified through silica gel flash column chromatography (hexane:ethyl acetate=3:1) to obtain Compound 25 (80 mg) as a red solid. Compound 25 was deprotected to obtain an isopropyl reduced component.

For comparison, a compound represented by the following Formula (C2) (dihydroethidium (DHE)) was prepared.

[Chem. 43]

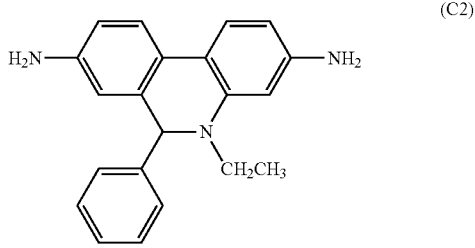

(C2)

4 μL of a 20 nmol/μL SNP solution (phosphate buffered saline (PBS) solution) was injected into the right striatum of the rat at a rate of 0.8 μL/min using a Hamilton syringe (26 gauge). 4 μL of PBS was injected into the left striatum in the same method. A bolus of 5 mg/kg DHE or isopropyl reduced component was administered from the caudal vein of the rat 60 minutes after SNP administration for SNP-administered rats (SNP model rats). The brain was extracted 1 hour after administration and a 20 μm-thick frozen section was prepared. Brain fluorescence images were obtained by a scanner type image analysis device (FLA700: excitation wavelength of 532 nm, filter 580 nm).

Figure 5:
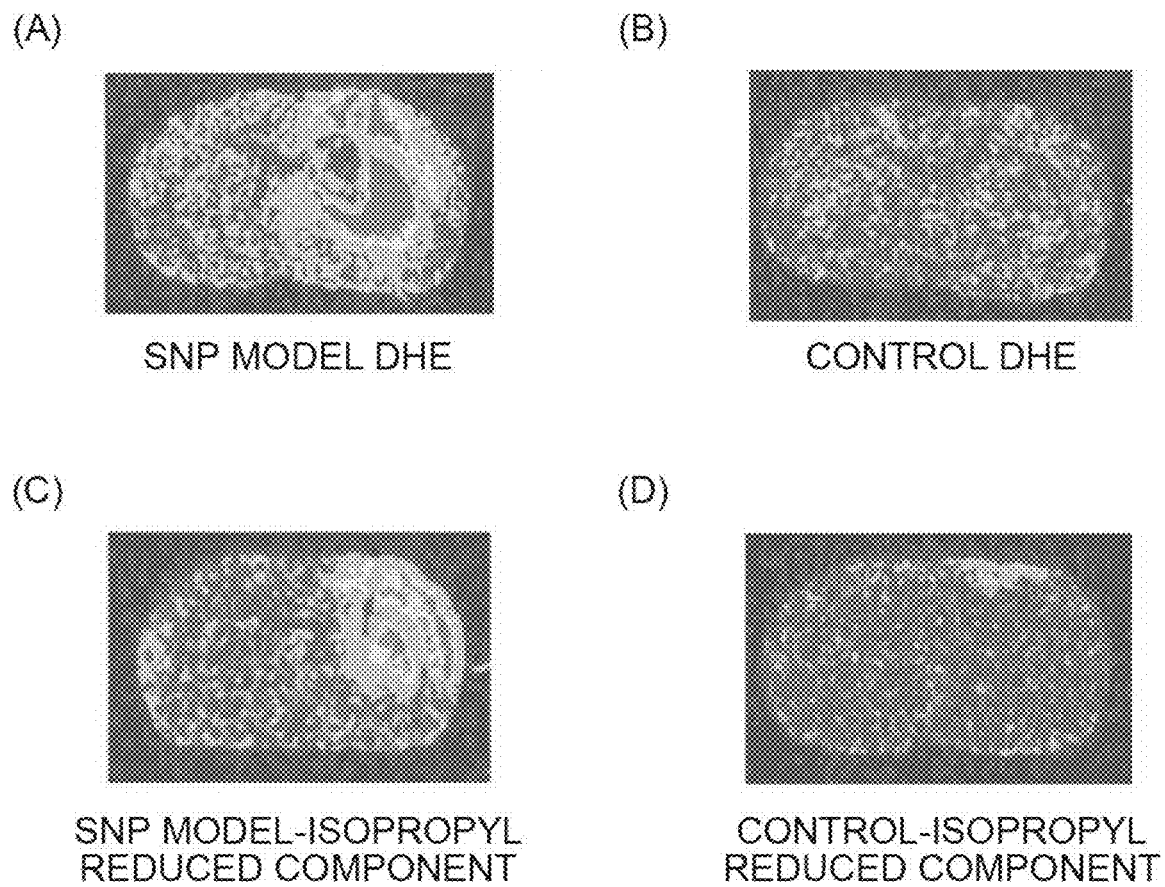
FIG. 5 shows brain fluorescence images of rats (SNP model rats and control rats) to which a compound represented by Formula (A23) or dihydroethidium (DHE) has been administered.

FIG. 5 shows brain fluorescence images. FIGS. 5(A) and 5(B) are fluorescence images showing the results obtained when DHE was administered. FIGS. 5(C) and 5(D) are fluorescence images showing the results obtained when an isopropyl reduced component was administered. FIGS. 5(A) and 5(C) are fluorescence images showing the results in the SNP model rats. FIGS. 5(B) and 5(D) are fluorescence images showing the results in the control rats.

As shown in FIG. 5, compared to when a conventional DHE was used, when the isopropyl reduced component according to the present invention was used, a large amount of accumulation in the right striatum to which SNP has been administered was shown. In addition, based on these results, it can be understood that the production of reactive oxygen species can be imaged with fluorescence.

The invention claimed is:

1. A compound represented by the following General Formula (1) or a salt thereof:

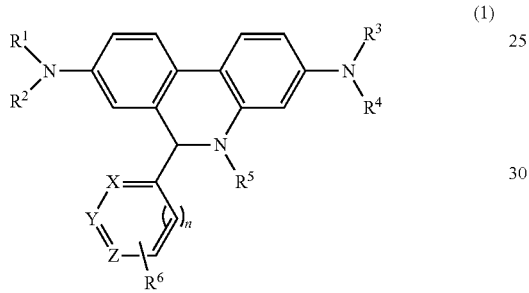

(1)

wherein, in General Formula (1), $R^1$, $R^2$, $R^3$ and $R^4$ each independently represent a hydrogen atom, a linear or branched alkyl group which may have a substituent, a linear or branched alkenyl group which may have a substituent, a linear or branched alkynyl group which may have a substituent, a cycloalkyl group which may have a substituent, an aromatic hydrocarbon group which may have a substituent, or a heterocyclic group which may have a substituent, wherein $R^1$ and $R^2$ may be bonded to each other to form a ring, wherein $R^3$ and $R^4$ may be bonded to each other to form a ring, wherein $R^1$ and/or $R^2$ may be bonded to a 6-membered ring to which $—NR^1R^2$ is bonded to form a ring, wherein $R^3$ and/or $R^4$ may be bonded to a 6-membered ring to which $—NR^3R^4$ is bonded to form ring, wherein $R^5$ represents $—^{11}CH_3$, a linear or branched alkyl group which may have a substituent, a linear or branched alkenyl group which may have a substituent, a linear or branched alkynyl group which may have a substituent, a cycloalkyl group which may have a substituent, an aromatic hydrocarbon group which may have a substituent, or a heterocyclic group which may have a substituent, wherein $R^6$ represents $—F$, $—CH_3$, $—^{18}F$ or $—^{11}CH_3$, wherein X, Y and Z each independently represent a carbon atom, an oxygen atom, a sulfur atom or a nitrogen atom, and wherein n is 0 or 1.

2. The compound or a salt thereof according to claim 1, wherein, in General Formula (1), $R^1$, $R^2$, $R^3$ and $R^4$ are not all hydrogen atoms.

3. The compound or a salt thereof according to claim 1, wherein, in General Formula (1), $R^1$ and $R^3$ are not both hydrogen atoms.

4. A reactive oxygen species imaging agent comprising the compound or a salt thereof according to claim 1, as an active ingredient.

5. A compound represented by the following General Formula (2) or a salt thereof:

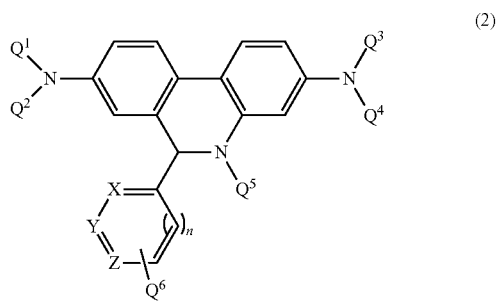

(2)

wherein, in General Formula (2), $Q^1$, $Q^2$, $Q^3$ and $Q^4$ each independently represent a hydrogen atom, a tert-butyloxycarbonyl group, a benzyloxycarbonyl group, a linear or branched alkyl group which may have a substituent, a linear or branched alkenyl group which may have a substituent, a linear or branched alkynyl group which may have a substituent, a cycloalkyl group which may have a substituent, an aromatic hydrocarbon group which may have a substituent, or a heterocyclic group which may have a substituent, wherein $Q^1$ and $Q^2$ may be bonded to each other to form a ring, wherein $Q^3$ and $Q^4$ may be bonded to each other to form a ring, wherein $Q^1$ and/or $Q^2$ may be bonded to a 6-membered ring to which $—NQ^1Q^2$ is bonded to form a ring, wherein $Q^3$ and/or $Q^4$ may be bonded to a 6-membered ring to which $—NQ^3Q^4$ is bonded to form a ring, wherein $Q^5$ represents $—^{11}CH_3$, a tert-butyloxycarbonyl group, a benzyloxycarbonyl group, a linear or branched alkyl group which may have a substituent, a linear or branched alkenyl group which may have a substituent, a linear or branched alkynyl group which may have a substituent, a cycloalkyl group which may have a substituent, an aromatic hydrocarbon group which may have a substituent, or a heterocyclic group which may have a substituent, wherein $Q^6$ represents a boronic acid group, a boronic acid ester group, a trifluoroborate base or a triolborate base, wherein X, Y and Z each independently represent a carbon atom, an oxygen atom, a sulfur atom or a nitrogen atom, and wherein n is 0 or 1.

* * * * *